United States Patent
He et al.

(10) Patent No.: US 12,489,555 B2
(45) Date of Patent: Dec. 2, 2025

(54) CODEWORD SYNCHRONIZATION METHOD, RECEIVER, NETWORK DEVICE, AND NETWORK SYSTEM

(71) Applicant: Huawei Technologies Co., Ltd., Shenzhen (CN)

(72) Inventors: Xiang He, Beijing (CN); Hao Ren, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 100 days.

(21) Appl. No.: 18/494,427

(22) Filed: Oct. 25, 2023

(65) Prior Publication Data
US 2024/0056218 A1 Feb. 15, 2024

Related U.S. Application Data

(63) Continuation of application No. PCT/CN2022/088943, filed on Apr. 25, 2022.

(30) Foreign Application Priority Data

Apr. 26, 2021 (CN) .......................... 202110455052.8
Aug. 6, 2021 (CN) .......................... 202110904102.6

(51) Int. Cl.
*H04L 1/00* (2006.01)
*H03M 5/00* (2006.01)
(Continued)

(52) U.S. Cl.
CPC .......... *H04L 1/0057* (2013.01); *H03M 5/145* (2013.01); *H04L 1/0045* (2013.01)

(58) Field of Classification Search
CPC ......... H04L 7/08; H04L 7/042; H04L 1/0041; H04L 1/0047; H04L 1/0057; H04L 1/0045; H03M 13/13; H03M 5/145
See application file for complete search history.

(56) References Cited

U.S. PATENT DOCUMENTS 5,400,348 A 3/1995 Yang
9,465,689 B2 * 10/2016 Benjamini ............. H04L 1/008
(Continued)

FOREIGN PATENT DOCUMENTS

CN 101542960 A 9/2009
CN 102571103 A 7/2012
(Continued)

OTHER PUBLICATIONS

IEEE Std 802.3™—2018, IEEE Standard for Ethernet LAN/MAN Standards Committee of the, IEEE Computer Society, Approved Jun. 14, 2018, total 5600 pages. Filed in 4 sections.
(Continued)

*Primary Examiner* — Justin R Knapp
(74) *Attorney, Agent, or Firm* — Slater Matsil, LLP

(57) ABSTRACT

This application relates to a codeword synchronization method, a chip, a network device, and a system. The codeword synchronization method includes: receiving a first data sequence, where the first data sequence includes a plurality of bits, and a codeword in the first data sequence includes extension information for verifying the codeword; selecting at least one group of bits from the plurality of bits as the extension information to perform verification, and determining a candidate bit in the plurality of bits based on a result of the verification; and determining a synchronization position based on the candidate bit, where the synchronization position indicates a start position of the codeword that is in the first data sequence.

23 Claims, 12 Drawing Sheets

(51) Int. Cl.
*H03M 5/14* (2006.01)
*H03M 13/00* (2006.01)

(56) References Cited

U.S. PATENT DOCUMENTS

| | | | |
|---|---|---|---|
| 2009/0154623 A1 | 6/2009 | Houcke et al. | |
| 2011/0176446 A1 | 7/2011 | Bourlas et al. | |
| 2012/0294609 A1* | 11/2012 | Leung | H04L 7/042 |
| | | | 398/43 |
| 2016/0149595 A1 | 5/2016 | Benjamini et al. | |
| 2019/0158214 A1* | 5/2019 | Howlader | H03M 13/23 |
| 2023/0023776 A1* | 1/2023 | Ren | H04L 7/08 |

FOREIGN PATENT DOCUMENTS

| | | |
|---|---|---|
| CN | 104868925 A | 8/2015 |
| EP | 4123932 A1 | 1/2023 |

OTHER PUBLICATIONS

IEEE Std 802.3bs™—2017, IEEE Standard for Ethernet, Amendment 10: Media Access Control Parameters, Physical Layers, and Management Parameters for 200 GB/s and 400 GB/s Operation, IEEE Computer Society, total 372 pages.

* cited by examiner

CODEWORD SYNCHRONIZATION METHOD, RECEIVER, NETWORK DEVICE, AND NETWORK SYSTEM

CROSS-REFERENCE TO RELATED APPLICATIONS

This application is a continuation of International Application No. PCT/CN2022/088943, filed on Apr. 25, 2022, which claims priority to Chinese Patent Application No. 202110455052.8, filed on Apr. 26, 2021 and Chinese Patent Application No. 202110904102.6, filed on Aug. 6, 2021. All of the aforementioned patent applications are hereby incorporated by reference in their entireties.

TECHNICAL FIELD

This application relates to the communications field, and in particular, to a codeword synchronization method, a receiver, a network device, and a network system.

BACKGROUND

With the improvement of manufacturing technologies, channel loss and noise have become key factors that limit a data transmission rate and distance. Introduction of forward error correction provides error correction protection for data in transmission, thereby improving the data transmission rate and transmission distance of the channel. Error correction codes for FEC can be classified into a block code and a convolutional code based on different information sequence processing manners. The block code can be further classified into a linear block code and a non-linear block code. The linear block code is widely used in the physical layer and the media access control sublayer of the data link layer in the open system interconnection model (OSI) where the Ethernet operates because of simple encoding and decoding of the linear block code.

Error detection and error correction functions of the linear block code needs to be implemented based on a complete codeword. Therefore, codeword boundaries in a data stream need to be determined, in other words, a start and an end of the complete codeword needs to be found. This process is called codeword synchronization or frame synchronization.

Currently, there is a synchronization solution applicable to the linear block code in the industry. An alignment marker (AM) synchronization solution used in the 200/400 GE in the 802.3 standard is used as an example. In this solution, a fixed AM sequence needs to be inserted at an interval of codewords of a specific length, and a receiving end can perform codeword synchronization by identifying the AM sequence. However, existence of the AM sequence is equivalent to insertion of additional data into a data stream at a transmitting end, and consequently redundant information is increased.

SUMMARY

Embodiments of this application provide a self-synchronization codeword synchronization method, a receiver, and a network device, to advantageously enable adding additional data in an AM synchronization solution.

According to a first aspect, this application provides a codeword synchronization method. The method includes: receiving a first data sequence, where the first data sequence includes a plurality of bits, and a codeword in the first data sequence includes extension information for verifying the codeword; selecting at least one group of bits from the plurality of bits as the extension information to perform verification, and determining a candidate bit in the plurality of bits based on a result of the verification; and determining a synchronization position based on the candidate bit, where the synchronization position indicates a start position of the codeword that is in the first data sequence.

The method is executed by a receiving end in a network. In the method, the result of the verification of the extension information in the codeword is considered in a codeword synchronization process. In the method, a technical effect of high-precision codeword synchronization of a data stream at the receiving end can be achieved without a need to insert additional data into a data stream at a transmitting end, and synchronization performance of the method reaches relatively high reliability.

In a possible implementation, the selecting at least one group of bits from the plurality of bits as the extension information to perform verification, and determining a candidate bit in the plurality of bits based on a result of the verification includes: selecting a plurality of observation bits from the first data sequence; and selecting, as the extension information to perform verification, a plurality of groups of bits from the plurality of bits based on the plurality of observation bits, and determining the candidate bit in the plurality of observation bits based on the result of the verification. In the implementation, in a process of determining the candidate bit, the result of the verification of the extension information in the codeword is considered, so as to improve accuracy of selecting the candidate bit.

In a possible implementation, the selecting, as the extension information to perform verification, a plurality of groups of bits from the plurality of bits based on the plurality of observation bits, and determining the candidate bit in the plurality of observation bits based on the result of the verification includes: determining a plurality of groups of first test data blocks in the first data sequence based on the plurality of observation bits, where each group of the plurality of groups of first test data blocks includes at least one first test data block, and a position of each of the plurality of observation bits is a start position of each group of the plurality of groups of first test data blocks; respectively selecting the plurality of groups of bits from the plurality of groups of first test data blocks as the extension information of the plurality of groups of first test data blocks to perform verification; and selecting one of the plurality of observation bits as the candidate bit based on the result of the verification.

In a possible implementation, the selecting one of the plurality of observation bits as the candidate bit based on the result of the verification includes: selecting one of the plurality of observation bits as the candidate bit based on the result of the verification and characteristic values of the plurality of groups of first test data blocks.

In a possible implementation, the selecting one of the plurality of observation bits as the candidate bit based on the result of the verification and characteristic values of the plurality of groups of first test data blocks includes: determining, based on the result of the verification, a plurality of groups of verified first test data blocks; and selecting one of the plurality of observation bits as the candidate bit based on characteristic values of the plurality of groups of verified first test data blocks.

In a possible implementation, the selecting one of the plurality of observation bits as the candidate bit based on the result of the verification and characteristic values of the plurality of groups of first test data blocks includes: determining a synchronization possibility index of each group of the plurality of groups of first test data blocks based on the result of the verification and the characteristic values of the plurality of groups of first test data blocks; and selecting one of the plurality of observation bits as the candidate bit based on the synchronization possibility index.

In a possible implementation, a quantity of the plurality of observation bits is P, P is a positive integer, and a length of the codeword is less than or equal to P bits.

In a possible implementation, the selecting a plurality of observation bits from the first data sequence includes: selecting one bit from the first data sequence as the observation bit at an interval of T bits, where T is an integer greater than 0; or selecting one bit from the first data sequence as the observation bit at an interval of (L*n+T) bits, where L is a quantity of test data blocks in the interval, a length of the test data block is n bits, and L and T are integers greater than 0.

In a possible implementation, the first data sequence is a modulated signal, the first data sequence includes a plurality of modulation symbols, and the selecting a plurality of observation bits from the first data includes: selecting a start bit of a modulation symbol from the first data sequence as the observation bit at an interval of T modulation symbols, where T is an integer greater than 0; or selecting a start bit of a modulation symbol from the first data sequence as the observation bit at an interval of (L*m+T) modulation symbols, where L is a quantity of test data blocks in the interval, a length of the test data block is m modulation symbols, and L and T are integers greater than 0.

In a possible implementation, the selecting at least one group of bits from the plurality of bits as the extension information to perform verification, and determining a candidate bit in the plurality of bits based on a result of the verification includes: selecting a first observation bit from the first data sequence; and selecting, based on the first observation bit, a group of bits from the plurality of bits as the extension information to perform verification, and when the verification succeeds, determining that the first observation bit is the candidate bit, or when the verification fails, selecting a second observation bit from the first data sequence.

In a possible implementation, the determining a synchronization position based on the candidate bit includes: verifying the candidate bit, and when the verification succeeds, determining a position of the candidate bit as the synchronization position.

In a possible implementation, the verifying the candidate bit includes: determining at least one second test data block in the first data sequence based on the candidate bit, where a length of an interval between the position of the candidate bit and a start position of the at least one second test data block is an integer multiple of the length of the codeword that is in the first data sequence; and verifying a characteristic value of the at least one second test data block, and when the verification succeeds, determining the position of the candidate bit as the synchronization position.

In a possible implementation, the verifying the candidate bit includes: determining at least one second test data block in the first data sequence based on the candidate bit, where a length of an interval between the position of the candidate bit and a start position of the at least one second test data block is an integer multiple of the length of the codeword that is in the first data sequence; and selecting at least one group of bits from the at least one second test data block as extension information to perform verification, and when the verification succeeds, determining the position of the candidate bit as the synchronization position.

In a possible implementation, the first data sequence includes a first subsequence and a second subsequence, the second subsequence is the same as, partially the same as, or different from the first subsequence, the candidate bit is included in the first subsequence, and the at least one second test data block is included in the second subsequence.

In a possible implementation, the characteristic value includes a quantity of test data blocks determined as correct codewords; the characteristic value is a quantity of all-zero sequences in a syndrome; the characteristic value is a quantity of zero elements in a syndrome; the characteristic value is a quantity of error-correctable test data blocks; or the characteristic value is a quantity of test data blocks that pass recheck, where in the test data blocks that pass the recheck, a first bit set obtained based on the first k bits is the same as original parity bits of the test data block, the first k bits of the codeword in the first data sequence are information bits, and k is an integer.

In a possible implementation, the characteristic value includes a quantity of test data blocks determined as incorrect codewords; the characteristic value is a quantity of non-all-zero sequences in a syndrome; the characteristic value is a quantity of non-zero elements in a syndrome; the characteristic value is a quantity of error-uncorrectable test data blocks; or the characteristic value is a quantity of test data blocks that fail recheck, where in the test data blocks that fail the recheck, a first bit set obtained based on the first k bits is different from original parity bits of the test data block, the first k bits of the codeword in the first data sequence are information bits, and k is an integer.

In a possible implementation, after the determining a synchronization position based on the candidate bit, the method further includes: receiving a second data sequence, where the second data sequence includes a plurality of bits; determining a synchronization position of the second data sequence based on the synchronization position of the first data sequence, where the synchronization position of the second data sequence indicates a start position of a codeword that is in the second data sequence; determining, based on the synchronization position of the second data sequence, whether the second data sequence is in loss-of-lock state; and in response to a case in which the second data sequence is in loss-of-lock state, determining an updated synchronization position of the second data sequence.

In a possible implementation, the codeword in the second data sequence includes extension information for verifying the codeword, and the determining an updated synchronization position of the second data sequence includes: selecting one group of bits from the plurality of bits included in the second data sequence as the extension information to perform verification, and determining a candidate bit in the second data sequence based on a result of the verification, where the candidate bit in the second data sequence is located in the plurality of bits included in the second data sequence; and determining the updated synchronization position of the second data sequence based on the candidate bit in the second data sequence.

In a possible implementation, the extension information is included in the information bits of the codeword, or the extension information is included in the parity bits of the codeword.

In a possible implementation, the extension information is for performing a parity check on the codeword, or the extension information is for performing a cyclic redundancy check CRC check on the codeword.

In a possible implementation, the data sequence is a linear block code.

In a possible implementation, the determining a synchronization position based on the candidate bit includes: verifying the candidate bit, and when the verification succeeds, determining a position of the candidate bit as the synchronization position.

In a possible implementation, at least one second test data block is obtained through division from the data sequence based on the candidate bit, where a length of an interval between the position of the candidate bit and a start position of the at least one second test data block is the integer multiple of the length of the codeword that is in the first data sequence; and a characteristic value of the at least one second test data block is verified, and when the verification succeeds, the position of the candidate bit is determined as the synchronization position.

In a possible implementation, that a characteristic value of the at least one second test data block is verified includes: Characteristic values of all of the at least one second test data block are sequentially accumulated to obtain an accumulated value. When the accumulated value meets a synchronization condition, the verification succeeds.

In a possible implementation, the accumulated value of the characteristic values is a quantity of second test data blocks that are determined as correct codewords and that are in the at least one second test data block, and the synchronization condition is that the accumulated value is greater than or equal to a synchronization threshold. Alternatively, the characteristic value is a quantity of all-zero sequences in a syndrome, and the synchronization condition is that the accumulated value is greater than or equal to a synchronization threshold. Alternatively, the characteristic value is a quantity of zero elements in a syndrome, and the synchronization condition is that the accumulated value is greater than or equal to a synchronization threshold. Alternatively, the characteristic value is a quantity of error-correctable test data blocks, and the synchronization condition is that the accumulated value is greater than or equal to a synchronization threshold. Alternatively, the characteristic value is a quantity of test data blocks whose recalculated parity bits are the same as original parity bits, and the synchronization condition is that the accumulated value is greater than or equal to a synchronization threshold. A length of the test data block is n bits, the first k bits of the test data block are information bits, the last (n−k) bits of the test data block are the original parity bits, the recalculated parity bits are obtained based on the information bits, a length of the recalculated parity bits is (n−k) bits, and n and k are integers.

In a possible implementation, that a characteristic value of the at least one second test data block is verified includes: Characteristic values of all of the at least one second test data block are added to obtain a total value. When the total value meets a synchronization condition, the verification succeeds.

In a possible implementation, the total value of the characteristic values is a quantity of second test data blocks that are determined as correct codewords and that are in the at least one second test data block, and the synchronization condition is that the total value is greater than or equal to a synchronization threshold. Alternatively, the total value of the characteristic values is a quantity of second test data blocks that are determined as incorrect codewords and that are in the at least one second test data block, and the synchronization condition is that the total value is less than or equal to a synchronization threshold. Alternatively, the characteristic value is a quantity of all-zero sequences in a syndrome, and the synchronization condition is that the total value is greater than or equal to a synchronization threshold. Alternatively, the characteristic value is a quantity of non-all-zero sequences in a syndrome, and the synchronization condition is that the total value is less than or equal to a synchronization threshold. Alternatively, the characteristic value is a quantity of zero elements in a syndrome, and the synchronization condition is that the total value is greater than or equal to a synchronization threshold. Alternatively, the characteristic value is a quantity of non-zero elements in a syndrome, and the synchronization condition is that the total value is less than or equal to a synchronization threshold. Alternatively, the characteristic value is a quantity of error-correctable test data blocks, and the synchronization condition is that the total value is greater than or equal to a synchronization threshold. Alternatively, the characteristic value is a quantity of error-uncorrectable test data blocks, and the synchronization condition is that the total value is less than or equal to a synchronization threshold. Alternatively, the characteristic value is a quantity of test data blocks whose recalculated parity bits are the same as original parity bits, and the synchronization condition is that the total value is greater than or equal to a synchronization threshold. Alternatively, the characteristic value is a quantity of test data blocks whose recalculated parity bits are different from original parity bits, and the synchronization condition is that the total value is less than or equal to a synchronization threshold. A length of the test data block is n bits, the first k bits of the test data block are information bits, the last (n−k) bits of the test data block are the original parity bits, the recalculated parity bits are obtained based on the information bits, a length of the recalculated parity bits is (n−k) bits, and n and k are integers.

In a possible implementation, a position of the candidate bit is used as the synchronization position.

In a possible implementation, a plurality of observation bits are selected from the data sequence, and the candidate bit is selected from the plurality of observation bits.

In a possible implementation, that the candidate bit is selected from the plurality of observation bits includes: A plurality of groups of first test data blocks are determined from the data sequence based on the plurality of observation bits, where each group of the plurality of groups of first test data blocks includes at least one first test data block, and a position of each of the plurality of observation bits is a start position of each group of the plurality of groups of first test data blocks. One of the plurality of observation bits is selected as the candidate bit based on characteristic values of the plurality of groups of first test data blocks.

In a possible implementation, that one of the plurality of observation bits is selected as the candidate bit based on characteristic values of the plurality of groups of first test data blocks includes: Whether a characteristic value of each group of the plurality of groups of first test data blocks meets a candidate condition is sequentially determined, until it is determined that a characteristic value of one group of first test data blocks meets the candidate condition. An observation bit corresponding to the group of first test data blocks that meets the candidate condition is used as the candidate bit.

In a possible implementation, the characteristic value of the group of first test data blocks is a total quantity value of all-zero sequences in syndromes of all of the group of first test data blocks, and the candidate condition is that the total value is greater than or equal to a synchronization threshold. Alternatively, the characteristic value of the group of first test data blocks is a total quantity value of non-all-zero sequences in syndromes of all of the group of first test data blocks, and the candidate condition is that the total value is less than or equal to a synchronization threshold. Alternatively, the characteristic value of the group of first test data blocks is a total quantity value of zero elements in syndromes of all of the group of first test data blocks, and the candidate condition is that the total value is greater than or equal to a synchronization threshold. Alternatively, the characteristic value of the group of first test data blocks is a total quantity value of non-zero elements in syndromes of all of the group of first test data blocks, and the candidate condition is that the total value is less than or equal to a synchronization threshold. Alternatively, the characteristic value of the group of first test data blocks is a total quantity value of error-correctable test data blocks in all of the group of first test data blocks, and the candidate condition is that the total value is greater than or equal to a synchronization threshold. Alternatively, the characteristic value of the group of first test data blocks is a total quantity value of error-uncorrectable test data blocks in all of the group of first test data blocks, and the candidate condition is that the total value is less than or equal to a synchronization threshold. Alternatively, the characteristic value of the group of first test data blocks is a total quantity value of test data blocks whose recalculated parity bits are the same as original parity bits and that are in all of the group of first test data blocks, and the candidate condition is that the total value is greater than or equal to a synchronization threshold. Alternatively, the characteristic value of the group of first test data blocks is a total quantity value of test data blocks whose recalculated parity bits are different from original parity bits and that are in all of the group of first test data blocks, and the candidate condition is that the total value is less than or equal to a synchronization threshold. Alternatively, the characteristic value of the group of first test data blocks is an accumulated quantity value of all-zero sequences in syndromes of the first X first test data blocks in the group of first test data blocks, and the candidate condition is that the accumulated value is greater than or equal to a synchronization threshold. Alternatively, the characteristic value of the group of first test data blocks is an accumulated quantity value of zero elements in syndromes of the first X first test data blocks in the group of first test data blocks, and the candidate condition is that the accumulated value is greater than or equal to a synchronization threshold. Alternatively, the characteristic value of the group of first test data blocks is an accumulated quantity value of error-correctable test data blocks in the first X first test data blocks in the group of first test data blocks, and the candidate condition is that the accumulated value is greater than or equal to a synchronization threshold. Alternatively, the characteristic value of the group of first test data blocks is an accumulated quantity value of test data blocks whose recalculated parity bits are the same as original parity bits in the first X first test data blocks in the group of first test data blocks, and the candidate condition is that the accumulated value is greater than or equal to a synchronization threshold. A length of the test data block is n bits, the first k bits of the test data block are information bits, the last (n−k) bits of the test data block are the original parity bits, the recalculated parity bits are obtained based on the information bits, the length of the recalculated parity bits is (n−k) bits, and n, k, and X are integers.

In a possible implementation, that one of the plurality of observation bits is selected as the candidate bit based on characteristic values of the plurality of groups of first test data blocks includes: Characteristic values of all of the plurality of groups of first test data blocks are compared, and an observation bit corresponding to a group of first test data blocks whose characteristic value is an extremum is used as the candidate bit.

In a possible implementation, the characteristic value is a quantity of all-zero sequences in a syndrome, and the extremum is a maximum value. Alternatively, the characteristic value is a quantity of non-all-zero sequences in a syndrome, and the extremum is a minimum value. Alternatively, the characteristic value is a quantity of zero elements in a syndrome, and the extremum is a maximum value. Alternatively, the characteristic value is a quantity of non-zero elements in a syndrome, and the extremum is a minimum value. Alternatively, the characteristic value is a quantity of error-correctable test data blocks, and the extremum is a maximum value. Alternatively, the characteristic value is a quantity of error-uncorrectable test data blocks, and the extremum is a minimum value. Alternatively, the characteristic value is a quantity of test data blocks whose recalculated parity bits are the same as original parity bits, and the extremum is a maximum value. Alternatively, the characteristic value is a quantity of test data blocks whose recalculated parity bits are different from original parity bits, and the extremum is a minimum value. A length of the test data block is n bits, the first k bits of the test data block are information bits, the last (n−k) bits of the test data block are the original parity bits, the recalculated parity bits are obtained based on the information bits, a length of the recalculated parity bits is (n−k) bits, and n and k are integers.

In a possible implementation, that a plurality of observation bits are selected from the data sequence includes: One bit is selected from the data sequence as the observation bit at an interval of T bits, where T is an integer greater than 0. Alternatively, one bit is selected from the data sequence as the observation bit at an interval of (L*n+T) bits, where L is a quantity of test data blocks in the interval, a length of the test data block is n bits, and L and T are integers greater than 0.

In a possible implementation, the data sequence is a modulated signal, the data sequence includes a plurality of modulation symbols, and that a plurality of observation bits are selected from the first data sequence includes: A start bit of a modulation symbol is selected from the data sequence as the observation bit at an interval of T modulation symbols, where T is an integer greater than 0. Alternatively, a start bit of a modulation symbol is selected from the data sequence as the observation bit at an interval of (L*m+T) modulation symbols, where L is a quantity of test data blocks in the interval, a length of the test data block is m modulation symbols, and L and T are integers greater than 0.

In a possible implementation, a quantity of the observation bits is P, P is a positive integer, and a length of the codeword is P bits.

In a possible implementation, when the candidate bit is determined from the plurality of bits based on the result of the verification, that a candidate bit in the data sequence is determined includes: A candidate bit in a first subsequence is determined. When the synchronization position is determined based on the candidate bit, that at least one second test data block is obtained through division from the data sequence based on the candidate bit includes: The at least one second test data block is obtained through division in a second subsequence based on the candidate bit, where the first subsequence and the second subsequence are included in the data sequence, and the second subsequence and the first subsequence are the same, partially the same, or different.

In a possible implementation, after the synchronization position is determined based on the candidate bit, the method further includes: In response to a case in which the data sequence is in loss-of-lock state, an updated synchronization position of the data sequence is determined.

In a possible implementation, that an updated synchronization position of the data sequence is determined includes: A group of bits is selected again from the plurality of bits as the extension information to perform verification, and an updated candidate bit in the data sequence is determined based on a result of the verification, where the updated candidate bit is included in the plurality of bits. The updated synchronization position of the data sequence is determined based on the updated candidate bit.

In a possible implementation, after the synchronization position is determined based on the candidate bit, the method further includes: A plurality of synchronization codewords are obtained through division from the data sequence based on the synchronization position, where the synchronization position is a start position of the plurality of synchronization codewords. Characteristic values of the plurality of synchronization codewords are verified. When the verification fails, it is determined that the data sequence is in loss-of-lock state.

In a possible implementation, that characteristic values of the plurality of synchronization codewords are verified includes: Characteristic values of all of the plurality of synchronization codewords are sequentially accumulated to obtain an accumulated value. When the accumulated value meets a loss-of-lock condition, the verification fails.

In a possible implementation, the characteristic value is a quantity of non-all-zero sequences in a syndrome, and the loss-of-lock condition is that the accumulated value is greater than or equal to a synchronization threshold. Alternatively, the characteristic value is a quantity of non-zero elements in a syndrome, and the loss-of-lock condition is that the accumulated value is greater than or equal to a synchronization threshold. Alternatively, the characteristic value is a quantity of error-uncorrectable codewords, and the loss-of-lock condition is that the accumulated value is greater than or equal to a synchronization threshold. Alternatively, the characteristic value is a quantity of codewords whose recalculated parity bits are different from original parity bits, and the loss-of-lock condition is that the accumulated value is greater than or equal to a synchronization threshold. A length of the codeword is n bits, the first k bits of the codeword are information bits, last (n–k) bits of the codeword are the original parity bits, the recalculated parity bits are obtained based on the information bits, a length of the recalculated parity bits is (n–k) bits, and n and k are integers.

In a possible implementation, that characteristic values of the plurality of synchronization codewords are verified includes: Characteristic values of all of the plurality of synchronization codewords are added to obtain a total value. When the total value meets a loss-of-lock condition, the verification fails.

In a possible implementation, the characteristic value is a quantity of all-zero sequences in a syndrome, and the loss-of-lock condition is that the total value is less than or equal to a synchronization threshold. Alternatively, the characteristic value is a quantity of non-all-zero sequences in a syndrome, and the loss-of-lock condition is that the total value is greater than or equal to a synchronization threshold. Alternatively, the characteristic value is a quantity of zero elements in a syndrome, and the loss-of-lock condition is that the total value is less than or equal to a synchronization threshold. Alternatively, the characteristic value is a quantity of non-zero elements in a syndrome, and the loss-of-lock condition is that the total value is greater than or equal to a synchronization threshold. Alternatively, the characteristic value is a quantity of error-correctable codewords, and the loss-of-lock condition is that the total value is less than or equal to a synchronization threshold. Alternatively, the characteristic value is a quantity of error-uncorrectable codewords, and the loss-of-lock condition is that the total value is greater than or equal to a synchronization threshold. Alternatively, the characteristic value is a quantity of codewords whose recalculated parity bits are the same as original parity bits, and the loss-of-lock condition is that the total value is less than or equal to a synchronization threshold. Alternatively, the characteristic value is a quantity of codewords whose recalculated parity bits are different from original parity bits, and the loss-of-lock condition is that the total value is greater than or equal to a synchronization threshold. A length of the codeword is n bits, the first k bits of the codeword are information bits, last (n–k) bits of the codeword are the original parity bits, the recalculated parity bits are obtained based on the information bits, a length of the recalculated parity bits is (n–k) bits, and n and k are integers.

In a possible implementation, the data sequence is a linear block code.

According to a second aspect, this application provides a chip. The chip includes at least one module, and the at least one module is configured to perform the method in any one of the first aspect or the possible implementations of the first aspect.

In a possible implementation, the module is a functional circuit in the chip.

According to a third aspect, this application provides a communication device, to perform the method in any one of the first aspect or the possible implementations of the first aspect. Specifically, the network device includes a unit configured to perform the method in any one of the first aspect or the possible implementations of the first aspect.

According to a fourth aspect, this application provides a communication device. The communication device includes a processor, a communication interface, and a memory. The communication interface may be a transceiver. The memory may be configured to store program code. The processor is configured to invoke the program code in the memory to perform the method in any one of the first aspect or the possible implementations of the first aspect. Details are not described herein again.

According to a fifth aspect, this application provides a network system. The network system includes a sending device and a receiving device, where the receiving device includes the chip provided in the second aspect, the receiving device is the communication device provided in the third aspect or the fourth aspect, and the receiving device is configured to receive a data sequence sent by the sending device.

According to a sixth aspect, this application provides a computer-readable storage medium. The computer-readable storage medium stores instructions; and when the instructions are run on a computer, the computer is enabled to perform the method in any one of the first aspect and the possible implementations of the first aspect.

According to a seventh aspect, this application provides a computer program product including computer program instructions. When the computer program product runs on a communication device, the communication device is enabled to perform the method in any one of the first aspect and the possible implementations of the first aspect.

According to an eighth aspect, this application provides a chip, including a memory and a processor. The memory is configured to store a computer program, and the processor is configured to invoke the computer program from the memory and run the computer program, to perform the method in any one of the first aspect and the possible implementations of the first aspect.

Optionally, the chip includes only a processor. The processor is configured to read and execute the computer program stored in the memory. When the computer program is executed, the processor performs the method in any one of the first aspect or the possible implementations of the first aspect.

According to a ninth aspect, this application provides a network node. The network node includes a main control board and an interface board. The main control board includes: a first processor and a first memory. The interface board includes: a second processor, a second memory, and an interface card. The main control board and the interface board are coupled.

The first memory may be configured to store program code. The first processor is configured to invoke the program code in the first memory to perform the following operations: selecting at least one group of bits from a plurality of bits as extension information to perform verification, and determining a candidate bit in the plurality of bits based on a result of the verification; and determining a synchronization position based on the candidate bit, where the synchronization position indicates a start position of a codeword that is in a first data sequence.

The second memory may be configured to store program code. The second processor is configured to invoke the program code in the second memory, to trigger the interface card to perform the following operation: receiving the first data sequence, where the first data sequence includes the plurality of bits, and the codeword in the first data sequence includes extension information for verifying the codeword.

In a possible implementation, an inter-process communication (inter-process communication, IPC) channel is established between the main control board and the interface board, and the main control board and the interface board communicate with each other through the IPC channel.

BRIEF DESCRIPTION OF THE DRAWINGS

To describe technical solutions of this application more clearly, the following briefly describes the accompanying drawings used in embodiments. It is clear that the accompanying drawings in the following descriptions merely show some embodiments of this application, and a person of ordinary skill in the art can derive other technical solutions and accompanying drawings of this application from these accompanying drawings without creative efforts.

DETAILED DESCRIPTION OF ILLUSTRATIVE EMBODIMENTS

The following describes embodiments of this application with reference to the accompanying drawings.

Due to an impact of channel loss and noise, an error may occur during signal transmission on the channel, and this affects reliability of a communication system. When the signal is represented in a form of a data sequence including a plurality of bits, the transmission error is specifically represented as a change in values of some bits in the data sequence, that is, a bit error occurs. FEC is a technology for controlling the transmission error in the communication system. In the FEC technology, redundant information is sent together with an original data sequence for error recovery in a transmission process, thereby reducing a bit error rate. The FEC can be classified into a block code and a convolutional code based on different information sequence processing manners. The block code can be further classified into a linear block code and a non-linear block code. A systematic code in the linear block code is used as an example. A transmitting end divides the original data sequence into groups, and a length of each group may be k bits. Further, in each group, according to a specific encoding rule, (n−k) bit redundant information, also referred to as parity bits, is added, and finally a codeword with a length of n bits is obtained. Therefore, in the codeword with the length of n bits, the first k bits include original data and are also referred to as information bits, the last (n−k) bits are the parity bits, and the entire codeword includes the information bits and the parity bits. After the codeword arrives at a receiving end through the channel, if a quantity of error bits in the codeword is within an error-correctable range, the receiving end may check and correct errors in a decoding process, and restore the received codeword to the original data sent by the transmitting end, thereby resisting interference caused by the channel and improving reliability of the communication system. Error detection and error correction functions of the linear block code needs to be implemented based on a complete codeword. Therefore, before decoding of a data sequence received by the receiving end, codeword boundaries in the data sequence need to be determined, in other words, a start position and an end position of the complete codeword need to be found. This process is referred to as codeword synchronization or frame synchronization. If the codeword synchronization is incorrect, in other words, true codeword boundaries are not determined, an appropriate effect of error detection or error correction cannot be implemented and bit errors may be even increased in a subsequent decoding process, which deteriorates performance of the communication system.

Figure 1:
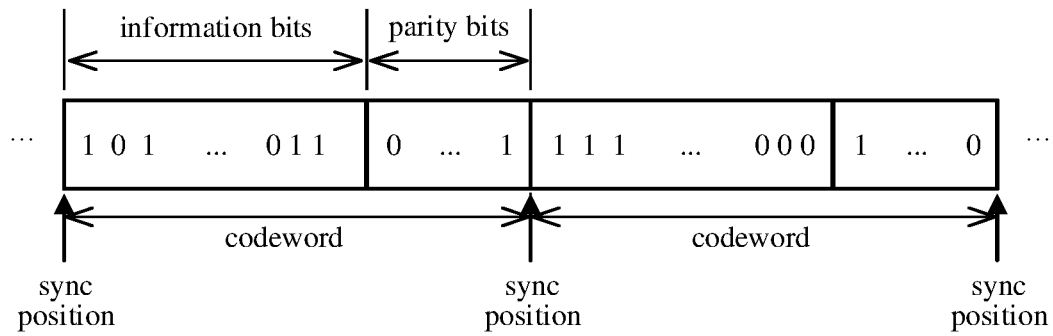
FIG. 1 is a synchronization position of a codeword according to an embodiment of this application.

A start position of each codeword may also be referred to as a synchronization position. Similarly, the systematic code is used as an example. FIG. 1 shows a synchronization position in a codeword. As shown in FIG. 1, a length of the entire codeword is n bits, where the first k bits include original data, the last (n−k) bits are additional parity bits added according to an encoding rule, and the synchronization position is a start position of the codeword, namely, a position of an initial bit in the codeword, where n and k are both integers. It can be learned that in the data sequence, there are a plurality of synchronization positions, and the plurality of synchronization positions are associated with each other. An interval between the synchronization positions is fixed, and the interval is the length of the codeword.

The codeword may further include extension information for verifying the codeword. For example, the linear block code may include the extension information for verifying the codeword. The extension information is for performing an additional check on the codeword to enhance performance of the codeword.

For example, the extension information may be located in the information bits in the codeword. For a code type of a (n, k) linear block code, if a length of the original data is less than k, for example, is only k−1, extension bit information (extended bit or symbol) of one bit or symbol may be added to the information bits to meet a requirement of (n, k) encoding, and the information bits including the extension bit information are encoded to generate the parity bits of (n−k) bits. Naturally, if the length of the original data is less than k by more bits, more extension information may be added. Use of the extension information may be adding useless padding, or adding functions such as a parity check or a CRC check. For example, a common code type in the industry is RS (272, 257) generated by truncating RS (544, 514) encoding. However, because 257 RS symbols (where each RS symbol herein is a 10-bit symbol) do not meet an encoding length requirement, the 257 RS symbols need to be extended to RS (272, 258), to be specific, one RS symbol is added to information bits of the 257 RS symbols to meet the encoding requirement. The newly added 10-bit symbol may be useless data padding from a PRBS sequence, or may be a CRC-10 check performed for the first 257 symbols, that is, may be the extension information.

For another example, the extension information may alternatively be located in the parity bits in the codeword. For a code type of a (n, k) linear block code, one or more bits may be additionally added as the extension information after the information bits are encoded. Use of the extension information may be adding useless padding, or adding functions such as a parity check or a CRC check. For example, a BCH (180, 170, t=1, m=10) linear block code may be obtained by adding one bit to BCH (179, 170, t=1, m=9) where m=9. In this case, a code block length after encoding is still 180 bits. The bit may be obtained through parity check on all information bits and parity bits, that is, may be the extension information.

In the foregoing two cases, the extension information may be separately distinguished from the codeword. In addition, there is another case in which the extension information cannot be separately distinguished from the codeword. For example, a Hamming (128, 119) linear block code may be extended from Hamming (126, 119), and a code block length after encoding is 128 bits. However, in this case, two newly added bits cannot be separately distinguished from the codeword.

Optionally, the extension information is for performing a parity check on the codeword, or the extension information is for performing a cyclic redundancy check CRC check on the codeword.

In embodiments of this application, although a systematic code is used as an example for description, this application is not limited to the systematic code, and is also applicable to a non-systematic code. This application can be applicable to communication systems using various linear block codes. The linear block code includes but is not limited to a Reed-Solomon code (RS code), a Bose-Chaudhuri-Hocquenghem code (BCH code), a low-density parity-check code (LDPC code), a Hamming code, a Golay code, a Reed-Muller code, and the like.

Embodiments of this application provide a codeword synchronization method and a device and a system based on the method. The method, the device, and the system are based on a same inventive concept. The method may include two phases. In the first phase, at least one group of first test data blocks is obtained through division based on at least one observation bit, at least one group of bits is selected from the at least one group of first test data blocks as extension information to perform verification, and an observation bit that is most likely to be located in a synchronization position is selected based on a result of the verification. In the second phase, a group of second test data blocks is obtained through division based on the observation bit that is most likely to be located in the synchronization position, and whether a position of the observation bit that is most likely to be located in the synchronization position is the synchronization position is determined based on the group of second test data blocks. The method may alternatively include only the first phase. After it is determined that the observation bit that is most likely to be located in the synchronization position is selected, the observation bit that is most likely to be located in the synchronization position is directly used as the synchronization position. In the method, the extension information in a codeword is used to perform verification, and a technical effect of high-precision codeword synchronization of a data stream at a receiving end can be achieved without a need to insert additional data into the data stream at the transmitting end, and synchronization performance of the method reaches relatively high reliability.

Figure 2:
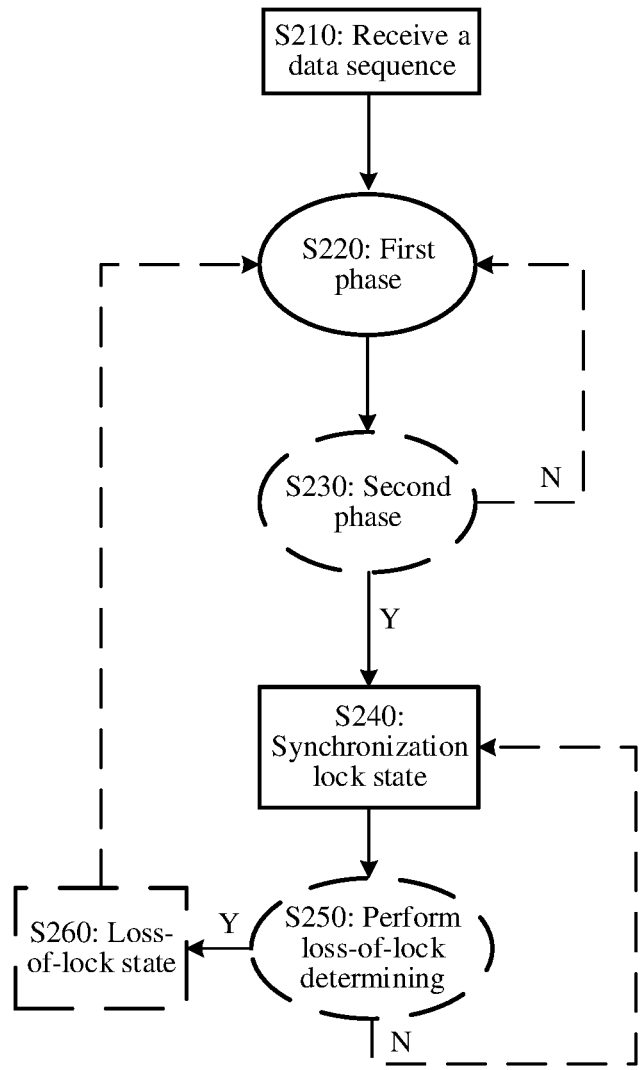
FIG. 2 is a synchronization flowchart according to an embodiment of this application.

FIG. 2 is a flowchart of a method according to an embodiment of this application. The method is applied to a receiving end device in a communication network. The receiving end device may be of various devices that perform FEC, including but not limited to a router, a switch, and a server. The receiving end device may be of various devices including Ethernet ports such as 10G, 25G, 40G, 100G, 400G, 800G, or 1.6T. The method includes the following steps.

S210: Receive a data sequence.

Specifically, a receiving end receives the data sequence from a transmitting end, where the data sequence includes a plurality of bits, and each bit is binary data. That is, the data sequence is a sequence including a plurality of bits, and may also be referred to as a bit sequence. In some embodiments, the data sequence is a linear block code. When the data sequence is transmitted through a channel, a bit error may exist, and operations such as error detection and error correction need to be performed. A codeword in the data sequence includes the foregoing extension information for verifying the codeword. To distinguish from another subsequently received data sequence, the data sequence may also be referred to as a first data sequence.

S220: In a first phase, select at least one group of bits from the plurality of bits as the extension information to perform verification, and determine a candidate bit in the plurality of bits based on a result of the verification. The candidate bit is an observation bit that is most likely to be located in a synchronization position and that is in at least one observation bit. In other words, a position of the candidate bit is a most possible synchronization position.

Figure 3:
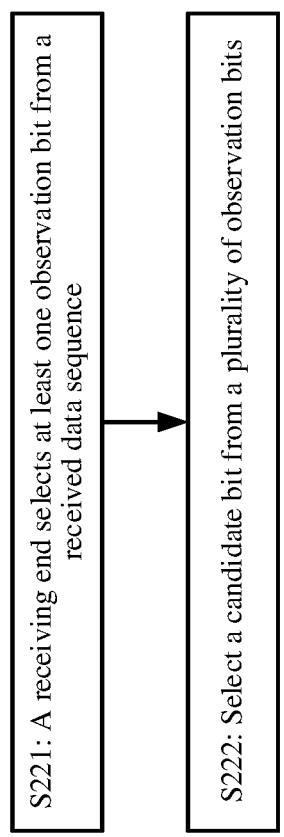
FIG. 3 is a synchronization flowchart according to an embodiment of this application.

As shown in FIG. 3, the first phase may include two steps: S221 and S222.

S221: The receiving end selects the at least one observation bit from the received data sequence. A position of the observation bit includes the synchronization position, in other words, a position of an observation bit in the at least one observation bit may be the synchronization position, or the position of the observation bit can cover the synchronization position.

Optionally, the receiving end selects a plurality of observation bits from the received data sequence.

Optionally, the receiving end selects one first observation bit from the received data sequence.

Optionally, in the first phase of the method, when the candidate bit in the data sequence is determined, only a part of the data sequence, for example, a first subsequence in the data sequence, is used, that is, the candidate bit in the first subsequence is determined. The first subsequence includes a plurality of bits, and the first subsequence may be any part of the data sequence. The receiving end selects the plurality of observation bits from the first subsequence, and any one of positions of these observation bits may be the synchronization position. For example, a quantity of the observation bits is P, and P is an integer greater than 1.

Optionally, when the plurality of observation bits are selected from the received data sequence, intervals between every two adjacent observation bits in the plurality of observation bits are the same, and a position of each of the plurality of observation bits sequentially moves forwards, along the direction of a data flow.

The concept of test data block is introduced in a codeword synchronization process. The test data block is a part of the data sequence, the test data block includes several consecutive bits, and a length of the test data block is the same as a length of the codeword. It may be considered that the test data block is for simulating the codeword.

Figure 4:
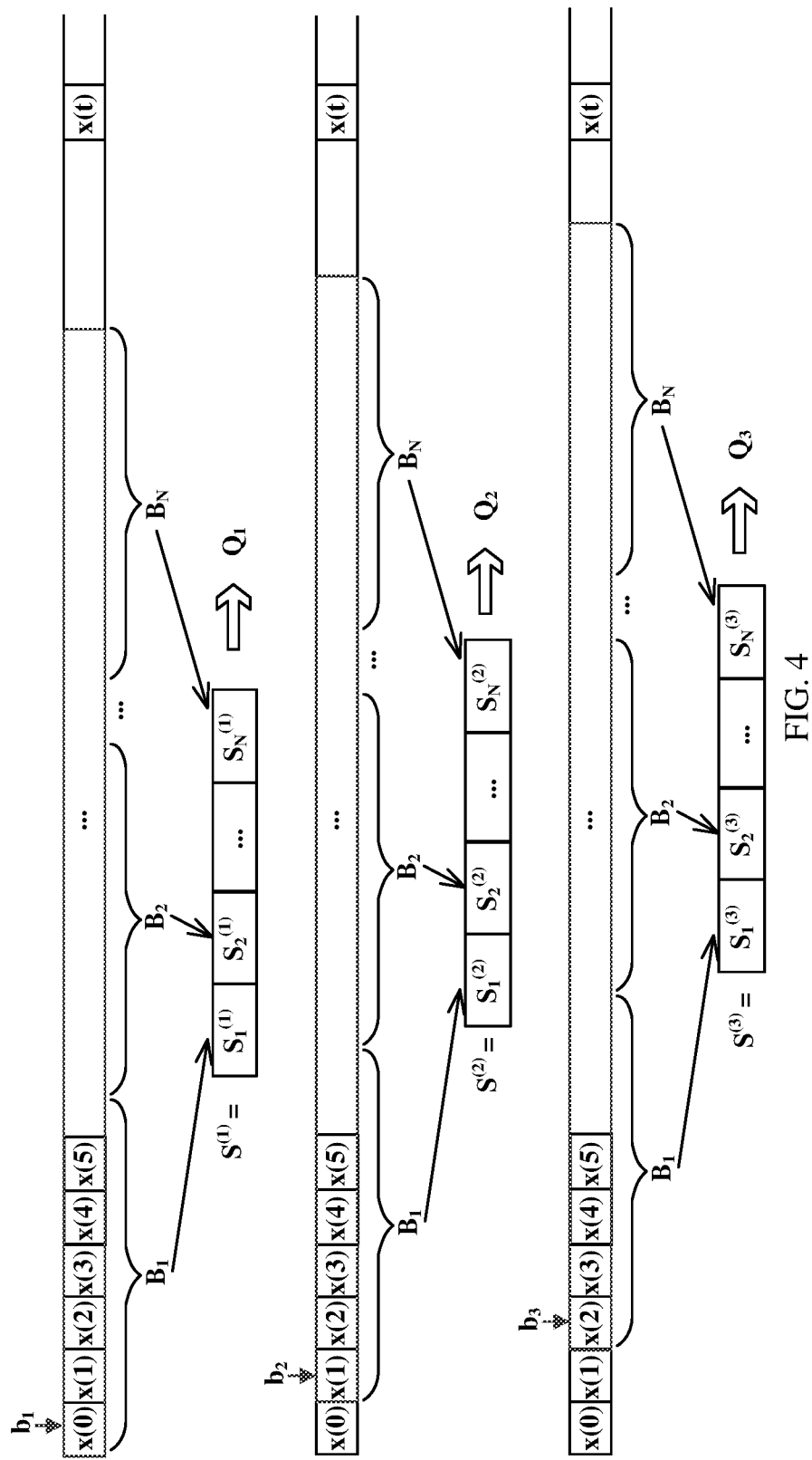
FIG. 4 is an observation bit selection method according to an embodiment of this application.

Optionally, the plurality of observation bits may be located in a same test data block, and a position of each of the plurality of observation bits in the same test data block is sequentially moved forwards. Specifically, one bit is selected as the observation bit at an interval of T bits, where T is an integer greater than 0. FIG. 4 shows a manner of selecting observation bits, where $b_1$, $b_2$, and $b_3$ are three adjacent observation bits, respectively corresponding to three bits $x(0)$, $x(1)$, and $x(2)$ in a data sequence. An interval between the observation bits is 1 bit, that is, T is 1. The three observation bits are located in a same test data block, for example, in a test data block obtained through division by using $x(0)$ as a start position in FIG. 4. In the test data block, a position of $b_1$ is the $1^{st}$ position in the test data block, and positions of $b_2$ and $b_3$ are sequentially the $2^{nd}$ and $3^{rd}$ positions in the test data block, that is, a position of each of the three observation bits in the same test data block sequentially moves forwards. Although FIG. 4 shows only three observation bits, a manner of selecting more observation bits may be deduced by analogy, and details are not described herein again.

Figure 5:
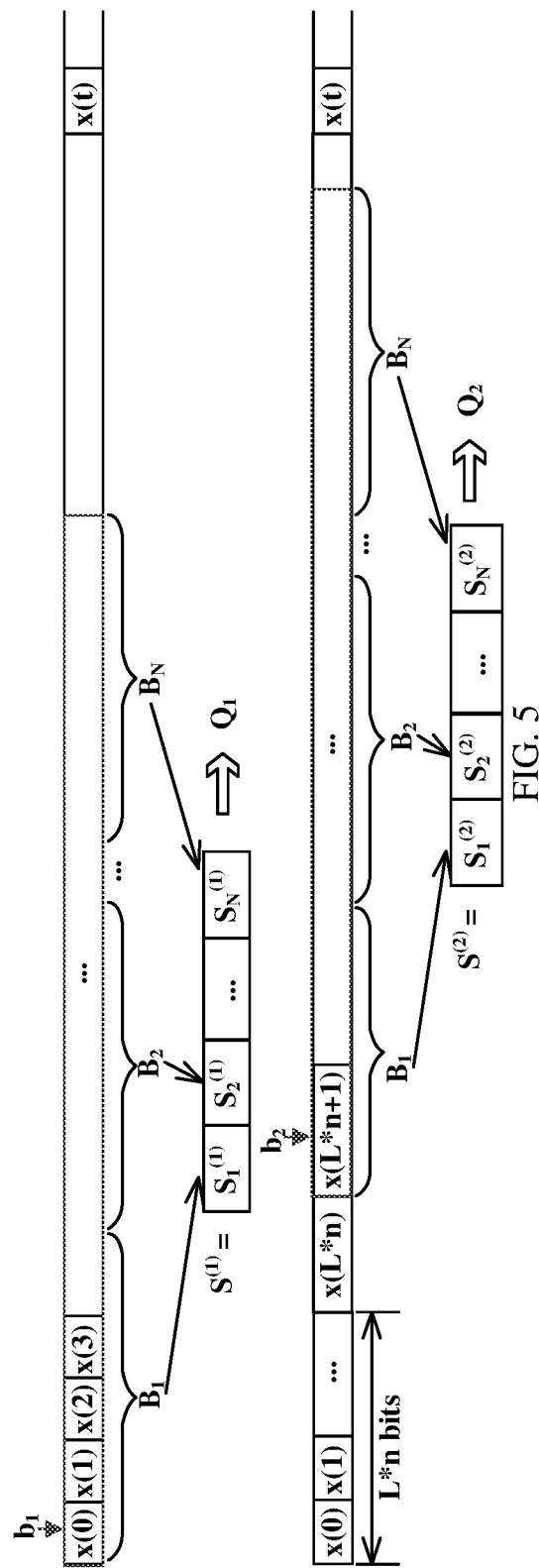
FIG. 5 is an observation bit selection method according to an embodiment of this application.

Optionally, the plurality of observation bits may be respectively located in a plurality of test data blocks, and a position of each of the plurality of observation bits in each test data block is sequentially moved forwards. Specifically, one bit is selected as the observation bit at an interval of (L*n+T) bits, where L is a quantity of test data blocks in the interval, a length of the test data block is n bits, and L and T are integers greater than 0. FIG. 5 shows a manner of selecting observation bits, where $b_1$ and $b_2$ are two adjacent observation bits, respectively corresponding to two bits $x(0)$ and $x(L*n+1)$ in a data sequence. The two observation bits are respectively located in two different test data blocks, for example, a test data block obtained through division by using $x(0)$ as a start position and a test data block obtained through division by using $x(L*n)$ as a start position in FIG. 5. An interval between the two test data blocks is L test data blocks, and an interval between the two observation bits is (L*n+1) bits, that is, T is 1. In the test data block obtained through division by using $x(0)$ as the start position, a position of $b_1$ is the $1^{st}$ position in the test data block, and in the test data block obtained through division by using $x(L*n)$ as the start position, a position of $b_2$ is the $2^{nd}$ position in the test data block, that is, a position of each of the two observation bits in each test data block sequentially moves forwards. Although FIG. 5 shows only two observation bits, a manner of selecting more observation bits may be deduced by analogy, and details are not described herein again. In this case, an interval between adjacent observation bits is longer, and correlation between the observation bits is lower, thereby reducing an impact caused by burst bit errors and improving accuracy of codeword synchronization.

Optionally, when the plurality of observation bits are selected, positions of the plurality of observation bits may traverse all positions in the test data block.

For example, when the plurality of observation bits are located in a same test data block, the positions of the plurality of observation bits may traverse all positions in the same test data block, in other words, the positions of the plurality of observation bits traverse all positions in a same codeword. In the manner of selecting observation bits shown in FIG. 4, a length of a codeword is n bits, and a quantity of observation bits is P. When P is equal to n, the positions of the plurality of observation bits traverse all the positions in the same test data block.

For example, when the plurality of observation bits are respectively located in a plurality of test data blocks, a same position in each of the plurality of test data blocks is considered as an equivalent position. For example, the $1^{st}$ position in each of the plurality of test data blocks is considered as an equivalent position, so that the positions of the plurality of observation bits traverse all equivalent positions, in other words, the positions of the plurality of observation bits traverse all positions in the plurality of test data blocks. In the manner of selecting observation bits shown in FIG. 5, a length of a codeword is n bits, which means that a quantity of equivalent positions is n; and a quantity of observation bits is P. When P is equal to n, the positions of the plurality of observation bits traverse all the equivalent positions, in other words, the positions of the plurality of observation bits may traverse all the positions in the plurality of test data blocks.

Optionally, when the plurality of observation bits are selected, positions of the plurality of observation bits may alternatively not traverse all positions in the codeword. That is, a value of P may be less than n.

If the positions of the plurality of observation bits traverse all the positions in the test data block, accuracy of a codeword synchronization result is higher. However, as a quantity of observation bits increases, system resources consumed in the codeword synchronization process also increase.

A signal may be modulated at the transmitting end, to obtain a modulated signal. Common modulation schemes include pulse amplitude modulation (PAM), quadrature amplitude modulation (QAM), and phase-shift keying (PSK). A pulse amplitude of the modulated signal may include a plurality of orders, and a quantity of the plurality of orders may be referred to as a modulation order. The PAM is used as an example. When the pulse amplitude of the modulated signal has two orders, the modulation order is 2, and a modulation scheme may be referred to as PAM2; when the pulse amplitude of the modulated signal has four orders, the modulation order is 4, and a modulation scheme may be referred to as PAM4; and so on. The modulated signal may be represented as a modulated data sequence. Compared with a basic unit of an unmodulated data sequence, a basic unit of the modulated data sequence is changed from a bit to a symbol. To be specific, in the modulated data sequence, a codeword includes several symbols, and a symbol includes several bits. A quantity of bits included in the symbol is related to the modulation order. When the modulation order is M, the quantity of bits included in the symbol is $\log_2 M$, where M is an integer multiple of 2. For example, when the modulation order is 2, the symbol includes one bit; when the modulation order is 4, the symbol includes two bits. It can be learned that a start position of the codeword is also a start position of a symbol rather than another position of the symbol. Therefore, for the modulated signal, when the plurality of observation bits are selected, only a start bit of the symbol may be considered, and other bits of the symbol do not need to be considered.

Figure 6:
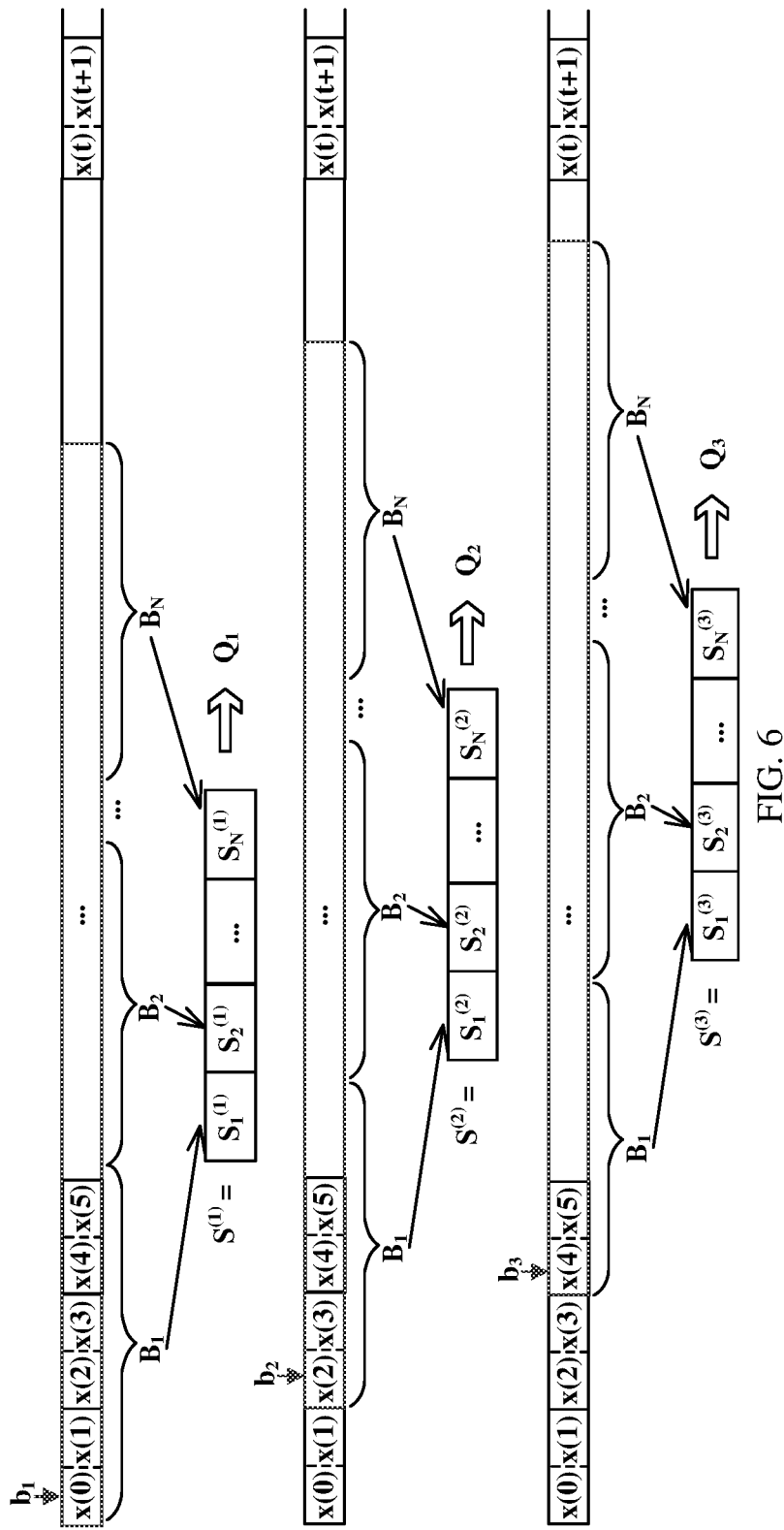
FIG. 6 is an observation bit selection method according to an embodiment of this application.

Optionally, the plurality of observation bits are respectively start bits of a plurality of symbols, the plurality of symbols are in a same test data block, and positions of the plurality of symbols in the same test data block sequentially move forwards. Specifically, a start bit of a modulation symbol is selected as the observation bit at an interval of T modulation symbols, where T is an integer greater than 0. In other words, the start bit of the modulation symbol is selected as the observation bit at an interval of $T \cdot \log_2 M$ bits. FIG. 6 shows a manner of selecting observation bits. A data sequence is a modulated signal, and a modulation order is 4. In this case, the data sequence includes a plurality of modulation symbols, and each symbol includes two bits, for example, a symbol including x(0) and x(1), a symbol including x(2) and x(3), a symbol including x(4) and x(5), and so on. $b_1$, $b_2$, and $b_3$ are three adjacent observation bits, respectively corresponding to three bits x(0), x(2), and x(4) in the data sequence. The three observation bits are respectively start bits of three symbols, and the three symbols are the symbol including x(0) and x(1), the symbol including x(2) and x(3), and the symbol including x(4) and x(5). There is an interval of one symbol between every two adjacent symbols in the three symbols, that is, T is 1. In addition, positions of the three symbols in a same test data block sequentially move forwards. Although FIG. 6 shows only three observation bits, a manner of selecting more observation bits may be deduced by analogy, and details are not described herein again.

Figure 7:
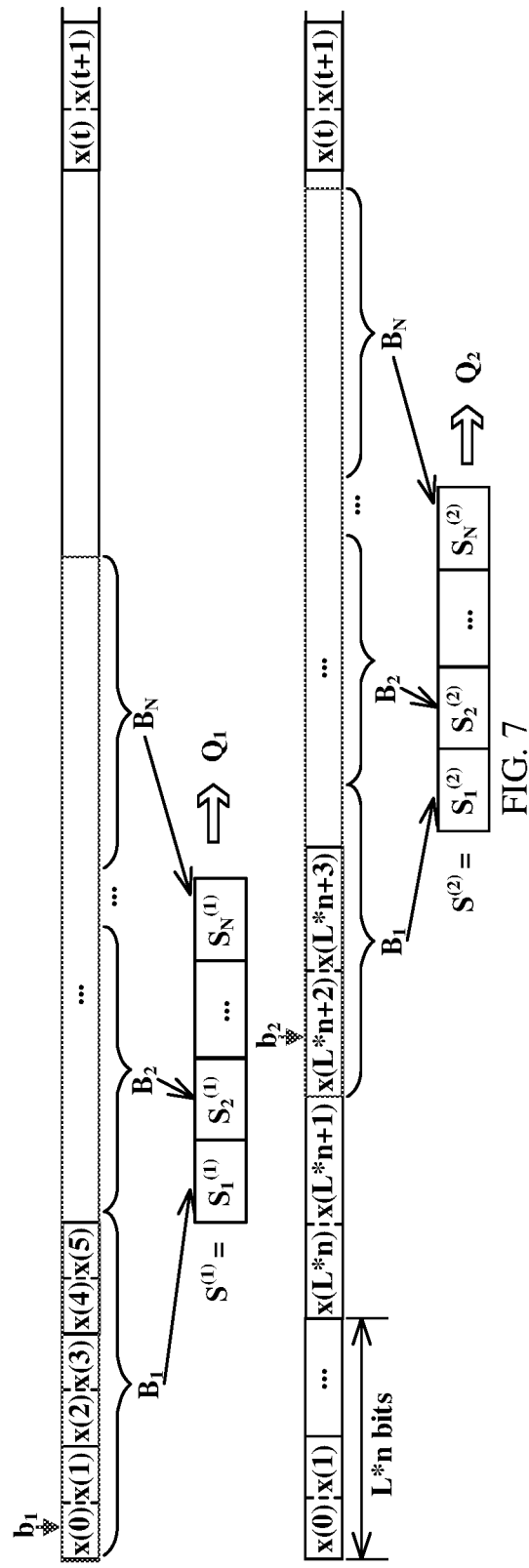
FIG. 7 is an observation bit selection method according to an embodiment of this application.

Optionally, the plurality of observation bits are respectively start bits of a plurality of symbols, the plurality of symbols are respectively located in a plurality of test data blocks, and a position of each of the plurality of symbols in each test data block sequentially moves forwards. Specifically, a start bit of a modulation symbol is selected as the observation bit at an interval of (L*m+T) modulation symbols, where L is a quantity of test data blocks in the interval, a length of the test data block is m modulation symbols, and L and T are integers greater than 0. In other words, the start bit of the modulation symbol is selected as the observation bit at an interval of $(L \cdot m + T) \cdot \log_2 M$ bits. FIG. 7 shows a manner of selecting observation bits. A data sequence is a modulated signal, and a modulation order is 4. In this case, the data sequence includes a plurality of modulation symbols, and each symbol includes two bits, for example, a symbol including x(0) and x(1), a symbol including x(L*n) and x(L*n+1), a symbol including x(L*n+2) and x(L*n+3), and so on. $b_1$ and $b_2$ are two adjacent observation bits, respectively corresponding to two bits x(0) and x(L*n+2) in the data sequence. The two observation bits are start bits of two symbols, and the two symbols are the symbol including x(0) and x(1) and the symbol including x(L*n+2) and x(L*n+3). In addition, the two observation bits are respectively located in two different test data blocks, for example, a test data block obtained through division by using x(0) as a start position and a test data block obtained through division by using x(L*n) as a start position in FIG. 7. An interval between the two test data blocks is L test data blocks, and an interval between the two observation bits is (L*m+1) symbols, that is, T is 1. In the test data block obtained through division by using x(0) as the start position, the symbol in which $b_1$ is located is the $1^{st}$ symbol in the test data block, and in the test data block obtained through division by using x(L*n) as the start position, the symbol in which $b_2$ is located is the $2^{nd}$ symbol in the test data block, that is, a position of each of the two symbols in each test data block sequentially moves forwards. Although FIG. 7 shows only two observation bits, a manner of selecting more observation bits may be deduced by analogy, and details are not described herein again. In this case, an interval between adjacent observation bits is longer, and correlation between the observation bits is lower, thereby reducing an impact caused by burst bit errors and improving accuracy of codeword synchronization.

Optionally, when the receiving end selects the plurality of observation bit from the received data sequence, the method includes the following step.

S222: Select, as the extension information to perform verification, a plurality of groups of bits from the plurality of bits based on the plurality of observation bits, and determine the candidate bit in the plurality of observation bits based on the result of the verification. The candidate bit is one of the plurality of observation bits, and the candidate bit is an observation bit that is most likely to be located in the synchronization position. Specifically, S222 may include two steps: S2221 and S2222.

S2221: Obtain a plurality of groups of first test data blocks from the data sequence through division based on the plurality of observation bits, where the plurality of groups of first test data blocks are in one-to-one correspondence with the plurality of observation bits. Specifically, each group of the plurality of groups of first test data blocks includes at least one first test data block, and a position of each of the plurality of observation bits is a start position of each group of the plurality of groups of first test data blocks.

Optionally, each of the plurality of observation bits is used as the start position, and N test data blocks following the observation bit are selected, where N is an integer greater than or equal to 1. The position of each of the plurality of observation bits is the start position of each group of the plurality of groups of first test data blocks. The N test data blocks selected based on each observation bit as the start position are one group of first test data blocks. In this case, each of the plurality of observation bits is used as the start position, and a plurality of groups of selected N test data blocks are the plurality of groups of first test data blocks. Each group of the plurality of groups of first test data blocks corresponds to an observation bit that is used as a start position of the group of first test data blocks, in other words, the plurality of groups of first test data blocks are in one-to-one correspondence with the plurality of observation bits.

Optionally, the N test data blocks may be consecutive, in other words, each group of first test data blocks includes N consecutive data blocks. When a length of each test data block is n bits, N*n consecutive bits after the test data block are selected. In this case, the N test data blocks are obtained.

Optionally, the N test data blocks may alternatively be inconsecutive, and a start position of each of the N test data blocks is associated with an observation bit corresponding to a group of the test data blocks. Specifically, an interval between the start position of each test data block and the observation bit corresponding to the group of test data blocks is an integer multiple of the length of the codeword, in other words, an interval between every two of the N test data blocks is an integer multiple of the length of the codeword. In addition, intervals between every two of the N test data blocks may be the same or may be different.

As shown in FIG. 4, a group of first test data blocks following the observation bit $b_1$ is selected by using the observation bit b1 as a start position. The group of first test data blocks includes N test data blocks, namely, $B_1$, $B_2, \ldots, B_N$, and a length of each test data block is n bits. Similarly, by using the observation bit $b_2$ or $b_3$ as a start position, a group of first test data blocks following the observation bit $b_2$ or $b_3$ can also be selected. A plurality of groups of first test data blocks are selected based on the observation bits $b_1$, $b_2$, or $b_3$ as a start position. In FIG. 5, FIG. 6, and FIG. 7, a manner of selecting the plurality of groups of first test data blocks is similar to that in FIG. 4, and details are not described herein again.

S2222: Respectively select the plurality of groups of bits from the plurality of groups of first test data blocks as the extension information of the plurality of groups of first test data blocks to perform verification, and select one of the plurality of observation bits as the candidate bit based on the result of the verification. The candidate bit is also the observation bit that is most likely to be located in the synchronization position.

According to the foregoing descriptions, the extension information in the codeword can be separately distinguished from the codeword in some cases, while the extension information cannot be separately distinguished from the codeword in some other cases.

Optionally, when the extension information can be separately distinguished from the codeword, selecting one of the plurality of observation bits as the candidate bit based on the result of the verification may be selecting one of the plurality of observation bits as the candidate bit based only on the result of the verification, or may be selecting one of the plurality of observation bits as the candidate bit based on the result of the verification and characteristic values of the plurality of groups of first test data blocks. In this case, the result of the verification is different from the characteristic values of the plurality of groups of first test data blocks.

Optionally, when the extension information cannot be separately distinguished from the codeword, selecting one of the plurality of observation bits as the candidate bit based on the result of the verification may be selecting one of the plurality of observation bits as the candidate bit based on characteristic values of the plurality of groups of first test data blocks. In this case, the result of the verification is the same as the characteristic values of the plurality of groups of first test data blocks.

Optionally, the selecting one of the plurality of observation bits as the candidate bit based on the result of the verification and characteristic values of the plurality of groups of first test data blocks specifically includes: determining, based on the result of the verification, a plurality of groups of verified first test data blocks; and selecting one of the plurality of observation bits as the candidate bit based on characteristic values of the plurality of groups of verified first test data blocks.

Optionally, the selecting one of the plurality of observation bits as the candidate bit based on the result of the verification and characteristic values of the plurality of groups of first test data blocks specifically includes: determining a synchronization possibility index of each group of the plurality of groups of first test data blocks based on the result of the verification and the characteristic values of the plurality of groups of first test data blocks; and selecting one of the plurality of observation bits as the candidate bit based on the synchronization possibility index.

Optionally, respectively selecting the plurality of groups of bits from the plurality of groups of first test data blocks as the extension information of the plurality of groups of first test data blocks to perform verification may be performing verification in a specific verification manner corresponding to the extension information. For example, if a simple parity check is used for the extension information, the check may be collecting statistics on a parity check result. For example, a quantity $Q_j$ of all-zero syndromes that pass the parity check in N syndromes may be used as a synchronization possibility index of a current observation bit $b_j$. A larger value of the index indicates that the corresponding observation bit is more likely to be located in a correct synchronization position. Alternatively, a quantity $Q_j$ of all-zero syndromes and a quantity $Q_{Pj}$ of syndromes that pass the parity check are separately counted, and are used as a synchronization possibility index of a current observation bit $b_j$. In this specific implementation, in a process of determining the candidate bit, verification of the extension information is considered, so that accuracy of the candidate bit can be improved, thereby improving accuracy of codeword synchronization.

Optionally, when one of the plurality of observation bits is selected, based on the characteristic values of the plurality of groups of first test data blocks, as the observation bit that is most likely to be located in the synchronization position, a selection manner may be a selection manner of early termination. Specifically, whether a characteristic value of each group of the plurality of groups of first test data blocks meets a candidate condition is sequentially determined, until it is determined that a characteristic value of one group of first test data blocks meets the candidate condition, and an observation bit corresponding to the group of first test data blocks that meets the candidate condition is used as the candidate bit.

Optionally, when one of the plurality of observation bits is selected, based on the characteristic values of the plurality of groups of first test data blocks, as the observation bit that is most likely to be located in the synchronization position, a selection manner may be a selection manner of traversal. Specifically, characteristic values of all of the plurality of groups of first test data blocks are compared, and an observation bit corresponding to one group of first test data blocks whose characteristic value is an extremum is used as the candidate bit.

In the selection manner of early termination and the selection manner of traversal, the characteristic values may be calculated in parallel, to be specific, characteristic values of a plurality of test data blocks are calculated by using a plurality of calculation units simultaneously. For example, 10 calculation units are used to calculate characteristic values of 10 test data blocks simultaneously. A parallel calculation mode can save computing time and reduce a latency.

Optionally, the characteristic value may be a characteristic value of a syndrome.

A parity-check matrix may be generated for each linear block code. The parity-check matrix describes a linear relationship between data in a codeword of the linear block code, and the parity-check matrix may be used in a decoding process. When the data sequence is the linear block code, the parity-check matrix also exists for the data sequence, and may be referred to as a parity-check matrix of the data sequence. Specifically, the data sequence and the parity-check matrix of the data sequence meet the following relational expression:

$$S = C \cdot H^T = \vec{0} \quad (1)$$

C is a codeword in a data sequence, S is a syndrome of the codeword, and H is a parity-check matrix of the data sequence. It can be learned from the foregoing relational expression (1) that the syndrome of the codeword in the data sequence is obtained by multiplying the codeword by a transposed matrix of the parity-check matrix of the data sequence, and the syndrome is a zero vector, namely, an all-zero matrix.

As described above, when the data sequence is the data sequence received by the receiving end, a start position of the codeword in the data sequence needs to be determined. If a correct start position is not used for obtaining the codeword through division from the data sequence, an obtained codeword no longer meets the foregoing relational expression (1). In this case, a syndrome of the codeword in the data sequence may be represented by the following relational expression:

$$S_R = R \cdot H^T \quad (2)$$

R is a codeword in the data sequence received by the receiving end, $S_R$ is a syndrome of the codeword, and H is a parity-check matrix of an original data sequence sent by the transmitting end. In the foregoing relational expression (2), the syndrome of the codeword in the data sequence received by the receiving end is a product of the codeword and a transposed matrix of the parity-check matrix of the original data sequence sent by the transmitting end. It can be learned from the foregoing analysis that, for the received codeword, when no bit error occurs in the codeword, $S_R$ is an all-zero matrix; and when a bit error exists in the codeword, $S_R$ is no longer an all-zero matrix at a high probability. Therefore, codeword synchronization may be implemented by using a syndrome of test data blocks in the data sequence received by the receiving end. Specifically, the syndrome of the test data blocks in the data sequence received by the receiving end may be used for selecting one of the plurality of observation bits as the observation bit that is most likely to be located in the synchronization position.

Optionally, a syndrome of each group of the plurality of groups of first test data blocks is calculated.

As shown in FIG. 4, a syndrome of a group of first test data blocks that use the observation bit $b_1$ as a start bit is calculated, that is, the syndrome $S^{(1)}$ shown in FIG. 4, including $S_1^{(1)}, S_2^{(1)}, \ldots, S_N^{(1)}$, respectively corresponding to test data blocks $B_1, B_2, \ldots, B_N$. By analogy, syndromes of groups of first test data blocks that respectively use the observation bits $b_2$ and $b_3$ as start bits are calculated, that is, the syndromes $S^{(2)}$ and $S^{(3)}$ shown in FIG. 4. Although FIG. 4 shows only a manner of calculating syndromes of groups of first test data blocks that use three observation bits as start bits, a manner of calculating more syndromes may be deduced by analogy, and details are not described herein again. In FIG. 5, FIG. 6, and FIG. 7, a manner of calculating syndromes of the plurality of groups of first test data blocks is similar to that in FIG. 4, and details are not described herein again.

For example, the characteristic value may be a quantity of all-zero sequences in the syndrome. When the foregoing selection manner of early termination is used, the candidate condition is associated with the characteristic value. The candidate condition may be that a characteristic value of a group of first test data blocks is greater than or equal to a synchronization threshold. Specifically, a relationship between a quantity of all-zero sequences in a syndrome of each group of first test data blocks and the synchronization threshold is sequentially determined until it is determined that a quantity of all-zero sequences in a syndrome of one group of first test data blocks is greater than or equal to the synchronization threshold, and an observation bit corresponding to the group of first test data blocks that meets the candidate condition is used as the candidate bit. The observation bit corresponding to the group of first test data blocks is an observation bit that is used as a start bit of the group of first test data blocks. It is easy to understand that, when the characteristic value is the quantity of all-zero sequences in the syndrome, the characteristic value may be the quantity of all-zero sequences in the syndrome, or may be a numerical indicator related to the quantity of all-zero sequences in the syndrome.

A value of the synchronization threshold may be obtained through simulation analysis. For example, a segment of data sequence is used as the data sequence received by the receiving end, and a bit error rate of the data sequence is designed to be within an acceptable range. A quantity of all-zero sequences in a syndrome of a group of test data blocks obtained through division based on the synchronization position and a quantity of all-zero sequences in a syndrome of a group of test data blocks obtained through division based on a non-synchronization position are separately counted, and the synchronization threshold is determined based on a difference between the two quantities, so that the synchronization threshold can be used for distinguishing the synchronization position and the non-synchronization position.

When the characteristic value is the quantity of all-zero sequences in the syndrome, and the foregoing selection manner of early termination is used, for a process of selecting the observation bit that is most likely to be located in the synchronization position, refer to FIG. 4. The synchronization threshold may be 2. As shown in FIG. 4, relationships between quantities of all-zero sequences in the syndromes $S^{(1)}$, $S^{(2)}$, and $S^{(3)}$ and the synchronization threshold are sequentially determined. For example, a quantity $Q_1$ of all-zero sequences in the syndrome of a first group of first test data blocks is 0, and is less than the synchronization threshold, and a quantity $Q_2$ of all-zero sequences in the syndrome of a second group of first test data blocks is 2, and is equal to the synchronization threshold. In this case, $b_2$ is selected as the observation bit that is most likely to be located in the synchronization position. In addition, when the determining is performed to $b_2$, and it is determined that $b_2$ meets the candidate condition, a relationship between a quantity of all-zero sequences in a syndrome corresponding to a subsequent observation bit and the synchronization threshold is no longer determined, that is, a relationship between the quantity of all-zero sequences in $S^{(3)}$ and the synchronization threshold is no longer determined.

Optionally, in the foregoing selection manner of early termination, for the characteristic value of each group of first test data blocks, a counting manner of early termination may also be used. To be specific, the characteristic value of the group of first test data blocks may be a total quantity value of all-zero sequences in syndromes of all of the group of first test data blocks. Correspondingly, the candidate condition may be that the total value is greater than or equal to the synchronization threshold. In the selection process shown in FIG. 4, when the relationships between the quantities of the all-zero sequences in each group of syndromes $S^{(1)}$, $S^{(2)}$, and $S^{(3)}$ and the synchronization threshold are sequentially determined, for each group of first test data blocks, a syndrome of each test data block is calculated in sequence. When the syndrome is an all-zero sequence, a quantity of all-zero sequences is increased by 1. When an accumulated value of the quantity of all-zero sequences meets the candidate condition, in other words, when the accumulated value of the quantity of all-zero sequences is greater than or equal to the synchronization threshold, it is considered that the group of first test data blocks meets the candidate condition, and calculation is no longer performed for a subsequent test data block whose syndrome is not calculated and that is in the group. For example, for the second group of first test data blocks, if both $S_1^{(1)}$ and $S_2^{(2)}$ are all-zero sequences, it is considered that the quantity $Q_2$ of all-zero sequences in the syndrome of the second group of first test data blocks has already accumulated to 2, and has reached the synchronization threshold. The group of first test data blocks meets the candidate condition. In this case, $b_2$ is selected as the observation bit that is most likely to be located in the synchronization position, and subsequent syndromes $S_3^{(2)}$ to $S_N^{(2)}$ are no longer calculated. Optionally, in the foregoing selection manner of early termination, for the characteristic value of each group of first test data blocks, a counting manner of traversal may also be used. To be specific, the characteristic value of the group of first test data blocks may be an accumulated quantity value of all-zero sequences in syndromes of the first X first test data blocks in the group of first test data blocks. Correspondingly, the candidate condition may be that the accumulated value is greater than or equal to the synchronization threshold. In a specific selection process, a syndrome of each first test data block in the group is calculated, so as to determine whether a total quantity value of all-zero sequences in a group of syndromes meets the candidate condition, in other words, whether the total quantity value of all-zero sequences in the group of syndromes is greater than or equal to the synchronization threshold. A specific operation process is not described herein again.

For example, the characteristic value may be a quantity of all-zero sequences in the syndrome. When the foregoing selection manner of traversal is used, the extremum is associated with the characteristic value. The extremum may be a maximum value. Specifically, a quantity of all-zero sequences in the syndrome of each group of first test data blocks may be counted, a group of first test data blocks with a largest quantity of all-zero sequences is determined, and an observation bit corresponding to the group of first test data blocks is used as the observation bit that is most likely to be located in the synchronization position.

When the characteristic value is the quantity of all-zero sequences in the syndrome, and the foregoing selection manner of traversal is used, for a process of selecting the observation bit that is most likely to be located in the synchronization position, refer to FIG. 4. As shown in FIG. 4, quantities of all-zero sequences in the syndromes $S^{(1)}$, $S^{(2)}$, and $S^{(3)}$ are separately counted, and are denoted as $Q_1$, $Q_2$, and $Q_3$ respectively, and a maximum value of the quantities is determined. For example, $Q_1=0$, $Q_2=0$, and $Q_3=2$, that is, the maximum value is $Q_{3=2}$. In this case, $b_3$ is selected as the observation bit that is most likely to be located in the synchronization position, and a position of $b_3$ is the most possible synchronization position.

For example, the characteristic value may be a quantity of non-all-zero sequences in the syndrome. When the foregoing selection manner of early termination is used, the candidate condition is associated with the characteristic value. The candidate condition may be that a characteristic value of a group of first test data blocks is less than or equal to a synchronization threshold. Specifically, a relationship between a quantity of non-all-zero sequences in a syndrome of each group of first test data blocks and the synchronization threshold is sequentially determined until it is determined that a quantity of non-all-zero sequences in a syndrome of one group of first test data blocks is less than or equal to the synchronization threshold, and an observation bit corresponding to the group of first test data blocks that meets the candidate condition is used as the candidate bit. A value of the synchronization threshold may alternatively be obtained through simulation analysis. A specific process is similar to that of the synchronization threshold corresponding to the all-zero sequence, and details are not described herein again.

For example, the characteristic value may be the quantity of non-all-zero sequences in the syndrome. When the foregoing selection manner of traversal is used, the extremum is associated with the characteristic value. The extremum may be a minimum value. Specifically, a quantity of non-all-zero sequences in the syndrome of each group of first test data blocks may be counted, a group of first test data blocks with a smallest quantity of non-all-zero sequences is determined, and an observation bit corresponding to the group of first test data blocks is used as the observation bit that is most likely to be located in the synchronization position.

For example, the characteristic value may be a quantity of zero elements in the syndrome. When the foregoing selection manner of early termination is used, the candidate condition is associated with the characteristic value. The candidate condition may be that a characteristic value of a group of first test data blocks is greater than or equal to a synchronization threshold. Specifically, a relationship between a quantity of zero elements in the syndrome of each group of first test data blocks and the synchronization threshold is sequentially determined until it is determined that a quantity of zero elements in a syndrome of one group of first test data blocks is greater than or equal to the synchronization threshold, and an observation bit corresponding to the group of first test data blocks that meets the candidate condition is used as the candidate bit. A value of the synchronization threshold may alternatively be obtained through simulation analysis.

For example, the characteristic value may be a quantity of zero elements in the syndrome. When the foregoing selection manner of traversal is used, the extremum is associated with the characteristic value. The extremum may be a maximum value. Specifically, a quantity of zero elements in the syndrome of each group of first test data blocks may be counted, a group of first test data blocks with a largest quantity of zero elements is determined, and an observation bit corresponding to the group of first test data blocks is used as the observation bit that is most likely to be located in the synchronization position.

For example, the characteristic value may be a quantity of non-zero elements in the syndrome. When the foregoing selection manner of early termination is used, the candidate condition is associated with the characteristic value. The candidate condition may be that a characteristic value of a group of first test data blocks is less than or equal to a synchronization threshold. Specifically, a relationship between a quantity of non-zero elements in the syndrome of each group of first test data blocks and the synchronization threshold is sequentially determined until it is determined that a quantity of non-zero elements in a syndrome of one group of first test data blocks is less than or equal to the synchronization threshold, and an observation bit corresponding to the group of first test data blocks that meets the candidate condition is used as the candidate bit. A value of the synchronization threshold may alternatively be obtained through simulation analysis.

For example, the characteristic value may be the quantity of non-zero elements in the syndrome. When the foregoing selection manner of traversal is used, the extremum is associated with the characteristic value. The extremum may be a minimum value. Specifically, a quantity of non-zero elements in the syndrome of each group of first test data blocks may be counted, a group of first test data blocks with a smallest quantity of non-zero elements is determined, and an observation bit corresponding to the group of first test data blocks is used as the observation bit that is most likely to be located in the synchronization position.

When the characteristic value is a quantity of a non-all-zero sequence, a zero element, or a non-zero element in the syndrome, for a specific implementation process of the data sequence shown in FIG. 4, refer to descriptions provided in a case that the characteristic value is a quantity of all-zero sequences in the syndrome, and details are not described herein again.

Optionally, the characteristic value may be an error-correctable characteristic value. After obtaining a codeword from the data sequence through division, the receiving end can determine a status of the codeword, where the status includes an error-correctable state and an error-uncorrectable state. When the codeword is in error-correctable state, the codeword is also referred to as an error-correctable codeword. When the codeword is in error-uncorrectable state, the codeword is also referred to as an error-uncorrectable codeword. An error-correctable characteristic value of a group of codewords may be associated with statuses of codewords in the group of codewords. Similarly, for a test data block obtained through division from the data sequence received by the receiving end, a status of the test data block can also be determined, where the status includes an error-correctable state and an error-uncorrectable state. When the test data block is in error-correctable state, the test data block is also referred to as an error-correctable test data block. When the test data block is in error-uncorrectable state, the test data block is also referred to as an error-uncorrectable test data block. An error-correctable characteristic value of a group of test data blocks may be associated with statuses of test data blocks in the group of test data blocks.

For example, the error-correctable characteristic value may be a quantity of error-correctable test data blocks. When the foregoing selection manner of early termination is used, the candidate condition is associated with the characteristic value. The candidate condition may be that the characteristic value of the group of first test data blocks is greater than or equal to the synchronization threshold. Specifically, a relationship between a quantity of error-correctable test data blocks of each group of first test data blocks and the synchronization threshold is sequentially determined until it is determined that a quantity of error-correctable test data blocks in one group of first test data blocks is greater than or equal to the synchronization threshold, and an observation bit corresponding to the group of first test data blocks that meets the candidate condition is used as the candidate bit. A value of the synchronization threshold may alternatively be obtained through simulation analysis.

When the error-correctable characteristic value is the quantity of error-correctable test data blocks, and the foregoing selection manner of early termination is used, for a process of selecting the observation bit that is most likely to be located in the synchronization position, refer to FIG. 4. The synchronization threshold may be 2. As shown in FIG. 4, a relationship between the quantity of error-correctable test data blocks in each group of first test data blocks and the synchronization threshold is sequentially determined. For example, the quantity $Q_1$ of error-correctable test data blocks in the first group of first test data blocks is 0, and is less than the synchronization threshold, and the quantity $Q_2$ of error-correctable test data blocks in the second group of first test data blocks is 2, and is equal to the synchronization threshold. In this case, $b_2$ is selected as the observation bit that is most likely to be located in the synchronization position. In addition, when the determining is performed to $b_2$, and it is determined that $b_2$ meets the candidate condition, a relationship between a quantity of error-correctable test data blocks corresponding to a subsequent observation bit and the synchronization threshold is no longer determined, that is, the relationship between $Q_3$ and the synchronization threshold is no longer determined.

For example, the error-correctable characteristic value may be the quantity of error-correctable test data blocks. When the foregoing selection manner of traversal is used, the extremum is associated with the characteristic value. The extremum may be a maximum value. Specifically, a quantity of error-correctable test data blocks in each group of first test data blocks may be counted, a group of first test data blocks with a largest quantity of error-correctable test data blocks is determined, and an observation bit corresponding to the group of first test data blocks is used as the observation bit that is most likely to be located in the synchronization position.

When the error-correctable characteristic value is the quantity of error-correctable test data blocks, and the foregoing selection manner of traversal is used, for a process of selecting the observation bit that is most likely to be located in the synchronization position, refer to FIG. 4. As shown in FIG. 4, quantities of error-correctable test data blocks in the groups of first test data blocks that respectively use the observation bits $b_1$, $b_2$, and $b_3$ as start bits are separately counted, and are denoted as $Q_1$, $Q_2$, and $Q_3$ respectively, and a maximum value of the quantities is determined. For example, $Q_1=0$, $Q_2=0$, and $Q_3=2$, that is, the maximum value is $Q_3=2$. In this case, $b_3$ is selected as the observation bit that is most likely to be located in the synchronization position, and a position of $b_3$ is the most possible synchronization position.

For example, the error-correctable characteristic value may be a quantity of error-uncorrectable test data blocks. When the foregoing selection manner of early termination is used, the candidate condition is associated with the characteristic value. The candidate condition may be that a characteristic value of a group of first test data blocks is less than or equal to a synchronization threshold. Specifically, a relationship between a quantity of error-uncorrectable test data blocks of each group of first test data blocks and the synchronization threshold is sequentially determined until it is determined that a quantity of error-uncorrectable test data blocks in one group of first test data blocks is less than or equal to the synchronization threshold, and an observation bit corresponding to the group of first test data blocks that meets the candidate condition is used as the candidate bit. A value of the synchronization threshold may alternatively be obtained through simulation analysis.

For example, the error-correctable characteristic value may be the quantity of error-uncorrectable test data blocks. When the foregoing selection manner of traversal is used, the extremum is associated with the characteristic value. The extremum may be a minimum value. Specifically, a quantity of error-uncorrectable test data blocks in each group of first test data blocks may be counted, a group of first test data blocks with a smallest quantity of error-uncorrectable test data blocks is determined, and an observation bit corresponding to the group of first test data blocks is used as the observation bit that is most likely to be located in the synchronization position.

It should be noted that, for data sequences of specific code types, when the characteristic value is the quantity of error-correctable test data blocks or the quantity of error-uncorrectable test data blocks, characteristic values corresponding to all observation bits may be basically the same due to features of the specific code types, and consequently, the synchronization method in this specific implementation is ineffective. Therefore, for the data sequences of the specific code types, it is recommended that other parameters except the quantity of error-correctable test data blocks or the quantity of error-uncorrectable test data blocks be used as the characteristic value. For example, a quantity of all-zero sequences in a syndrome is selected as the characteristic value, so as to ensure that the synchronization method in this specific implementation is effective. The data sequences of the specific code types may be, for example, a non-shortened linear block code with an error correction capability of 1, for example, BCH (127,120).

Optionally, the characteristic value may be a recheck characteristic value. The recheck characteristic value is associated with a relationship between recalculated parity bits and original parity bits. Based on the foregoing descriptions, in a codeword with a length of n bits, the first k bits are information bits. The codeword further includes parity bits, and the parity bits are obtained through calculation based on the information bits of the first k bits according to a specific encoding rule. For the data sequence received by the receiving end, if a start position of the codeword in the data sequence is not found, the foregoing relationship between information bits and parity bits is no longer met in the codeword obtained through division. In other words, even if the same feature encoding rule is used, and the first k bits are used as a basis, content that is the same as original parity bits in each test data block cannot be obtained. In each test data block in the data sequence received by the receiving end, bits corresponding to the original parity bits and the first k bits may no longer meet the specific encoding rule. Therefore, when content obtained through recalculation according to the specific encoding rule and based on the first k bits in each test data block in the data sequence received by the receiving end is compared with the original parity bits in each test data block in the data sequence received by the receiving end, there may be a difference. In the data sequence received by the receiving end, the content obtained through recalculation according to the specific encoding rule and based on the first k bits in each test data block in the data sequence received by the receiving end may be called recalculated parity bits.

It can be known from the foregoing analysis that, when there is an error bit in the test data block, the recalculated parity bits are different from the original parity bits. Therefore, the recalculated parity bits in each test data block in the data sequence received by the receiving end may be compared with the original parity bits to implement codeword synchronization. Specifically, the recalculated parity bits in each test data block in the data sequence received by the receiving end may be compared with the original parity bits, and one of the plurality of observation bits is selected as the observation bit that is most likely to be located in the synchronization position.

For example, the recheck characteristic value may be a quantity of test data blocks that pass recheck, namely, a quantity of test data blocks whose recalculated parity bits are the same as the original parity bits. When the foregoing selection manner of early termination is used, the candidate condition is associated with the characteristic value. The candidate condition may be that the characteristic value is greater than or equal to a synchronization threshold. Specifically, a relationship between a quantity of test data blocks whose recalculated parity bits are the same as the original parity bits and that are in each group of first test data blocks and the synchronization threshold is sequentially determined until it is determined that a quantity of test data blocks whose recalculated parity bits are the same as the original parity bits and that are in one group of first test data blocks is greater than or equal to the synchronization threshold, and an observation bit corresponding to the group of first test data blocks that meets the candidate condition is used as the candidate bit. A value of the synchronization threshold may alternatively be obtained through simulation analysis.

When the recheck characteristic value is the quantity of test data blocks whose recalculated parity bits are the same as the original parity bits, when the foregoing selection manner of early termination is used, for a process of selecting the observation bit that is most likely to be located in the synchronization position, refer to FIG. 4. The synchronization threshold may be 2. As shown in FIG. 4, a relationship between the quantity of test data blocks whose recalculated parity bits are the same as the original parity bits and that are in each group of first test data blocks and the synchronization threshold is sequentially determined. For example, the quantity $Q_1$ of test data blocks whose recalculated parity bits are the same as the original parity bits and that are in the first group of first test data blocks is 0, and is less than the synchronization threshold, and the quantity $Q_2$ of test data blocks whose recalculated parity bits are the same as the original parity bits and that are in the second group of first test data blocks is 2, and is equal to the synchronization threshold. In this case, $b_2$ is selected as the observation bit that is most likely to be located in the synchronization position. In addition, when the determining is performed to $b_2$, and it is determined that $b_2$ meets the candidate condition, a relationship between a quantity of test data blocks whose recalculated parity bits are the same as the original parity bits and that correspond to a subsequent observation bit and the synchronization threshold is no longer determined, that is, the relationship between $Q_3$ and the synchronization threshold is no longer determined.

For example, the recheck characteristic value may be the quantity of test data blocks whose recalculated parity bits are the same as the original parity bits. When the foregoing selection manner of traversal is used, the extremum is associated with the characteristic value. The extremum may be a maximum value. Specifically, a quantity of test data blocks whose recalculated parity bits are the same as the original parity bits and that are in each group of first test data blocks may be counted, a group of first test data blocks with a largest quantity of test data blocks whose recalculated parity bits are the same as the original parity bits is determined, and an observation bit corresponding to the group of first test data blocks is used as the observation bit that is most likely to be located in the synchronization position.

When the recheck characteristic value is the quantity of test data blocks whose recalculated parity bits are the same as the original parity bits, when the foregoing selection manner of traversal is used, for a process of selecting the observation bit that is most likely to be located in the synchronization position, refer to FIG. 4. As shown in FIG. 4, quantities of test data blocks whose recalculated parity bits are the same as the original parity bits and that are in the groups of first test data blocks that respectively use the observation bits $b_1$, $b_2$, and $b_3$ as start bits are separately counted, and are denoted as $Q_1$, $Q_2$, and $Q_3$ respectively, and a maximum value of the quantities is determined. For example, $Q_1=0$, $Q_2=0$, and $Q_3=2$, that is, the maximum value is $Q_3=2$. In this case, $b_3$ is selected as the observation bit that is most likely to be located in the synchronization position, and a position of $b_3$ is the most possible synchronization position.

For example, the recheck characteristic value may be a quantity of test data blocks that fail recheck, namely, a quantity of test data blocks whose recalculated parity bits are different from the original parity bits. When the foregoing selection manner of early termination is used, the candidate condition is associated with the characteristic value. The candidate condition may be that the characteristic value is less than or equal to a synchronization threshold. Specifically, a relationship between a quantity of test data blocks whose recalculated parity bits are different from the original parity bits and that are in each group of first test data blocks and the synchronization threshold is sequentially determined until it is determined that a quantity of test data blocks whose recalculated parity bits are different from the original parity bits and that are in one group of first test data blocks is less than or equal to the synchronization threshold, and an observation bit corresponding to the group of first test data blocks that meets the candidate condition is used as the candidate bit. A value of the synchronization threshold may alternatively be obtained through simulation analysis.

For example, the recheck characteristic value may be the quantity of test data blocks whose recalculated parity bits are different from the original parity bits. When the foregoing selection manner of traversal is used, the extremum is associated with the characteristic value. The extremum may be a minimum value. Specifically, a quantity of test data blocks whose recalculated parity bits are different from the original parity bits and that are in each group of first test data blocks may be counted, a group of first test data blocks with a smallest quantity of test data blocks whose recalculated parity bits are different from the original parity bits is determined, and an observation bit corresponding to the group of first test data blocks is used as the observation bit that is most likely to be located in the synchronization position.

Optionally, synchronization possibility indexes of the plurality of observation bits are separately determined based on the characteristic values of the plurality of groups of first test data blocks. A larger value of the synchronization possibility index indicates a higher probability that a position of the observation bit is the synchronization position. For example, when the characteristic value of each group of the plurality of groups of first test data blocks is the quantity of all-zero sequences in the syndrome of each group of the plurality of groups of first test data blocks, the synchronization possibility index may be positively correlated with the quantity of all-zero sequences. To be specific, a larger quantity of all-zero sequences indicates a larger value of the synchronization possibility index, indicating a higher probability that the position of the observation bit is the synchronization position. For example, when the characteristic value of each group of the plurality of groups of first test data blocks is the quantity of non-all-zero sequences in the syndrome of each group of the plurality of groups of first test data blocks, the synchronization possibility index may be negatively correlated with the quantity of non-all-zero sequences. To be specific, a smaller quantity of non-all-zero sequences indicates a larger value of the synchronization possibility index, indicating a higher probability that the position of the observation bit is the synchronization position. Similarly, when the characteristic value of each group of the plurality of groups of first test data blocks is the quantity of zero elements in the syndrome of each group of the plurality of groups of first test data blocks, or the characteristic value of each group of the plurality of groups of first test data blocks is the quantity of error-correctable test data blocks in each group of the plurality of groups of first test data blocks, or the characteristic value of each group of the plurality of groups of first test data blocks is the quantity of test data blocks whose recalculated parity bits are the same as the original parity bits and that are in each group of the plurality of groups of first test data blocks, the synchronization possibility index may be positively correlated with the quantity of zero elements, the quantity of error-correctable test data blocks, or the quantity of test data blocks whose recalculated parity bits are the same as the original parity bits. When the characteristic value of each group of the plurality of groups of first test data blocks is the quantity of non-zero elements in the syndrome of each group of the plurality of groups of first test data blocks, or the characteristic value of each group of the plurality of groups of first test data blocks is the quantity of error-uncorrectable test data blocks in each group of the plurality of groups of first test data blocks, or the characteristic value of each group of the plurality of groups of first test data blocks is the quantity of test data blocks whose recalculated parity bits are different from the original parity bits and that are in each group of the plurality of groups of first test data blocks, the synchronization possibility index may be negatively correlated with the quantity of non-zero elements, the quantity of error-uncorrectable test data blocks, or the quantity of test data blocks whose recalculated parity bits are different from the original parity bits. Details are not described herein again.

Optionally, when there is more than one observation bit with a maximum value of the synchronization possibility index in the plurality of groups of first test data blocks, one observation bit may be selected, based on another condition, as the observation bit that is most likely to be located in the synchronization position. For example, one observation bit is randomly selected, from observation bits with the maximum value of the synchronization possibility index, as the observation bit that is most likely to be located in the synchronization position. For example, an observation bit that is ranked first in the data sequence is selected, from observation bits with the maximum value of the synchronization possibility index, as the observation bit that is most likely to be located in the synchronization position.

Optionally, when the receiving end selects a first observation bit from the received data sequence, the method includes the following step.

S222': Select, based on the first observation bit, a group of bits from the plurality of bits as the extension information to perform verification; and when the verification succeeds, determine that the first observation bit is the candidate bit, or when the verification fails, select a second observation bit from the first data sequence, and repeat the verification until the verification succeeds. For a specific operation of the verification, refer to the descriptions of S222. Details are not described herein again.

S230: In a second phase, verify the candidate bit; and when the verification succeeds, determine the position of the candidate bit as the synchronization position. Specifically, S230 may include two steps: S231 and S232.

S231: Obtain a group of second test data blocks from the data sequence through division based on the candidate bit, where the group of second test data blocks includes at least one second test data block. The candidate bit is the observation bit that is most likely to be located in the synchronization position.

Optionally, in the second phase, in the method, when the at least one second test data block is obtained from the data sequence through division based on the candidate bit, only a part, for example, a second subsequence in the data sequence, of the data sequence may be used. One group of second test data blocks is obtained from the data sequence through division based on the candidate bit, in other words, one group of second test data blocks is obtained from the second subsequence through division based on the candidate bit.

Optionally, the second subsequence may be the same as the first subsequence in the first phase, to be specific, all bits of the second subsequence are the same as those of the first subsequence, and the two subsequences completely overlap. Optionally, the second subsequence may be partially the same as the first subsequence in the first phase, to be specific, some bits of the second subsequence are the same as those of the first subsequence, and the two subsequences partially overlap. Optionally, the second subsequence may be different from the first subsequence in the first phase, to be specific, all bits of the second subsequence are different from those of the first subsequence, and the two subsequences do not have an intersection set.

When an intersection set of data used in the first phase and data used in the second phase is smaller, the data used in the first phase and the data used in the second phase are more independent of each other, and the accuracy of the codeword synchronization result is higher. Therefore, when the first subsequence is different from the second subsequence, the accuracy of the codeword synchronization result is higher.

In the second phase, the group of second test data blocks is obtained from the second subsequence through division based on the candidate bit, namely, the observation bit that is most likely to be located in the synchronization position, where the group of second test data blocks includes the at least one second test data block.

That the group of second test data blocks is obtained from the second subsequence through division based on the candidate bit may be as follows: The candidate bit is used as a start bit of the at least one second test data block, so as to obtain the at least one second test data block through division.

That the group of second test data blocks is obtained from the second subsequence through division based on the observation bit that is most likely to be located in the synchronization position may also be as follows: The observation bit that is most likely to be located in the synchronization position may be used as a start bit of the test data block, so as to divide the second subsequence into a plurality of test data blocks, and select at least one of the plurality of test data blocks as the at least one second test data block. In this case, there is an interval of several test data blocks between the at least one second test data block and the observation bit that is most likely to be located in the synchronization position, and the at least one second test data block may be located before the observation bit that is most likely to be located in the synchronization position, or may be located after the observation bit that is most likely to be located in the synchronization position.

Optionally, the at least one second test data block may be consecutive, in other words, the at least one second test data block includes N consecutive data blocks. When a length of each test data block is n bits, N*n consecutive bits after the test data block are selected. In this case, the at least one second test data block is obtained.

Optionally, the at least one second test data block may alternatively be discontinuous, and a start position of each of the at least one second test data block is associated with the candidate bit. Specifically, an interval between the start position of each test data block and the candidate bit is an integer multiple of the length of the codeword, in other words, an interval between every two of the at least one second test data block is an integer multiple of the length of the codeword. In addition, intervals between every two of the at least one second test data block may be the same or may be different.

S232: Verify a characteristic value of the at least one second test data block, and/or select at least one group of bits from the at least one second test data block as extension information to perform verification; and when the verification succeeds, determine the position of the candidate bit as the synchronization position.

Optionally, that the verification succeeds may mean that the verification performed on the characteristic value of the at least one second test data block succeeds; or the verification performed by selecting the at least one group of bits from the at least one second test data block as the extension information succeeds.

Optionally, that the verification succeeds may mean that the verification performed on the characteristic value of the at least one second test data block succeeds; and the verification performed by selecting the at least one group of bits from the at least one second test data block as the extension information succeeds.

Optionally, for a verification manner of the verification performed by selecting the at least one group of bits from the at least one second test data block as the extension information, refer to the descriptions of the verification of the extension information in the first phase, and details are not described herein again.

Optionally, a verification manner of the verification performed on the characteristic value of the at least one second test data block may be a verification manner of early termination. Specifically, a characteristic value of each of the at least one second test data block is sequentially accumulated to obtain an accumulated value. When the accumulated value meets a synchronization condition, the verification succeeds, and the position of the candidate bit is determined as the synchronization position.

The synchronization condition is associated with the characteristic value. Specifically, the characteristic value is a quantity of all-zero sequences in a syndrome, and the synchronization condition is that the accumulated value is greater than or equal to a synchronization threshold; the characteristic value is a quantity of zero elements in a syndrome, and the synchronization condition is that the accumulated value is greater than or equal to a synchronization threshold; the characteristic value is a quantity of error-correctable test data blocks, and the synchronization condition is that the accumulated value is greater than or equal to a synchronization threshold; or the characteristic value is a quantity of test data blocks whose recalculated parity bits are the same as original parity bits, and the synchronization condition is that the accumulated value is greater than or equal to a synchronization threshold.

A value of the synchronization threshold may alternatively be obtained through simulation analysis. In addition, the synchronization threshold in step 230 and the synchronization threshold in step 2222 may have a same value, or may have different values.

Optionally, a verification manner of the verification performed on the characteristic value of the at least one second test data block may be a verification manner of traversal. Specifically, characteristic values of all of the at least one second test data block are added to obtain a total value. When the total value meets a synchronization condition, the verification succeeds, and the position of the candidate bit is determined as the synchronization position.

The synchronization condition is associated with the characteristic value. Specifically, the characteristic value is a quantity of all-zero sequences in a syndrome, and the synchronization condition is that the total value is greater than or equal to a synchronization threshold; the characteristic value is a quantity of non-all-zero sequences in a syndrome, and the synchronization condition is that the total value is less than or equal to a synchronization threshold; the characteristic value is a quantity of zero elements in a syndrome, and the synchronization condition is that the total value is greater than or equal to a synchronization threshold; the characteristic value is a quantity of non-zero elements in a syndrome, and the synchronization condition is that the total value is less than or equal to a synchronization threshold; the characteristic value is a quantity of error-correctable test data blocks, and the synchronization condition is that the total value is greater than or equal to a synchronization threshold; the characteristic value is a quantity of error-uncorrectable test data blocks, and the synchronization condition is that the total value is less than or equal to a synchronization threshold; the characteristic value is a quantity of test data blocks whose recalculated parity bits are the same as original parity bits, and the synchronization condition is that the total value is greater than or equal to a synchronization threshold; or the characteristic value is a quantity of test data blocks whose recalculated parity bits are different from original parity bits, and the synchronization condition is that the total value is less than or equal to a synchronization threshold.

A value of the synchronization threshold may alternatively be obtained through simulation analysis. In addition, the synchronization threshold in step 230 and the synchronization threshold in step 2222 may have a same value, or may have different values.

In the verification manner of early termination and the verification manner of traversal, the characteristic values may be calculated in parallel, to be specific, characteristic values of a plurality of test data blocks are calculated by using a plurality of calculation units simultaneously. For example, 10 calculation units are used to calculate characteristic values of 10 test data blocks simultaneously. A parallel calculation mode can save computing time and reduce a latency.

Figure 8:
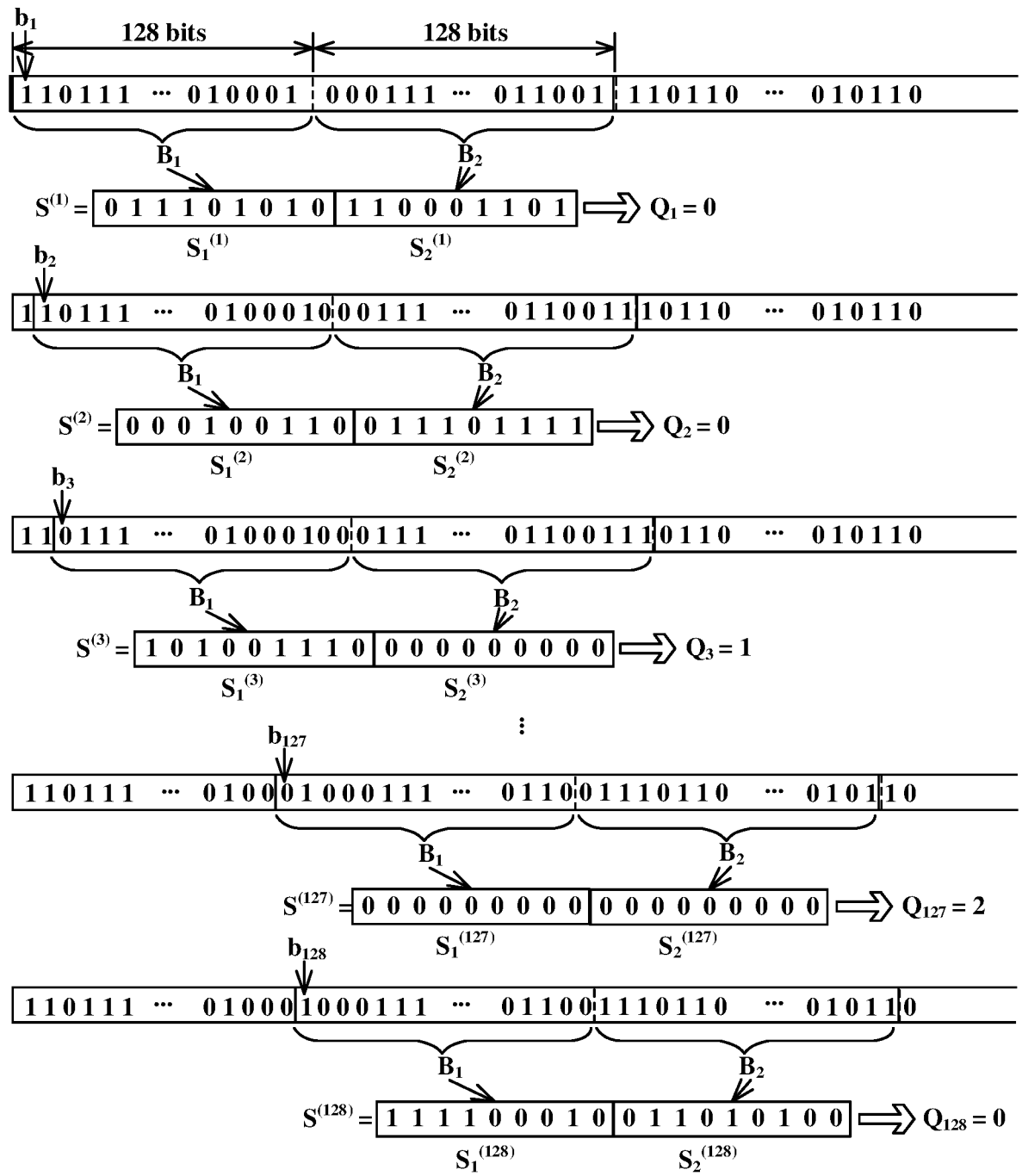
FIG. 8 is a first phase of synchronous lock determining according to an embodiment of this application.
Figure 9:
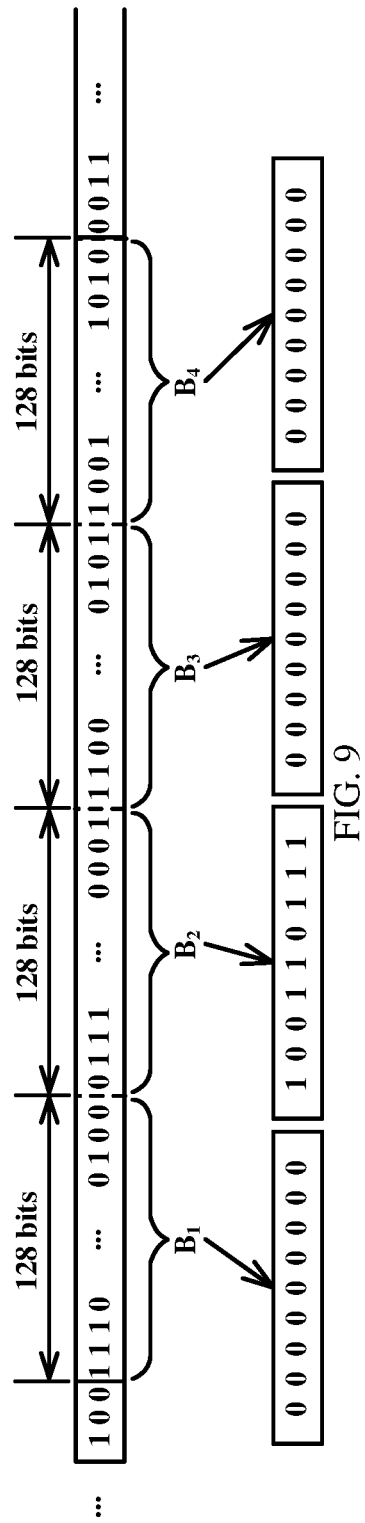
FIG. 9 is a second phase of synchronous lock determining according to an embodiment of this application.

FIG. 8 and FIG. 9 show an example process of determining the observation bit (namely, the candidate bit) that is most likely to be located in the synchronization position and that is in the data sequence, and verifying whether the position of the candidate bit is the synchronization position. A linear block code shown in FIG. 8 is a Hamming (128, 119) code including extension information, in other words, a length of each codeword is 128 bits, and a length of information data in each codeword is 119 bits. A modulation scheme used by the Hamming (128, 119) code in channel transmission is a non-return-to-zero (NRZ) code, and a modulation order M is 2. In this case, each symbol includes one bit. A parity-check matrix of the Hamming (128, 119) code is shown as follows:

$$H = \begin{bmatrix} 0 & 1 & 0 & 1 & 0 & 1 & \ldots & 1 & 1 & 1 & 1 & 0 & 1 \\ 0 & 0 & 1 & 1 & 0 & 0 & \ldots & 1 & 0 & 1 & 0 & 1 & 1 \\ 0 & 0 & 0 & 0 & 1 & 1 & \ldots & 1 & 0 & 0 & 1 & 1 & 1 \\ 0 & 0 & 0 & 0 & 0 & 0 & \ldots & 0 & 1 & 1 & 1 & 1 & 1 \\ 0 & 0 & 0 & 0 & 0 & 0 & \ldots & 1 & 1 & 1 & 1 & 1 & 1 \\ 0 & 0 & 0 & 0 & 0 & 0 & \ldots & 1 & 1 & 1 & 1 & 1 & 1 \\ 0 & 0 & 0 & 0 & 0 & 0 & \ldots & 1 & 1 & 1 & 1 & 1 & 1 \\ 1 & 0 & 0 & 1 & 0 & 1 & \ldots & 1 & 0 & 1 & 1 & 0 & 1 \\ 1 & 1 & 1 & 1 & 1 & 1 & \ldots & 1 & 1 & 1 & 1 & 1 & 1 \end{bmatrix}$$

A size of the matrix is 9×128. For a construction method, refer to the OIF Implementation Agreement 400ZR standard document, which is incorporated by reference herein as if fully set forth herein.

FIG. 8 shows a part of the data sequence received by the receiving end. The start position, namely, the synchronization position, of the codeword in the data sequence needs to be determined. With reference to the foregoing descriptions, in the first phase, the observation bit (namely, the candidate bit) that is most likely to be located in the synchronization position and that is in the data sequence is determined. As shown in FIG. 8, in the first phase, a segment is selected as the first subsequence from the received data sequence, and a start bit of a modulation symbol is selected as an observation bit at an interval of T·$\log_2$ M bits in the first subsequence, where T is 1, that is, the start bit of the modulation symbol is selected as an observation bit at an interval of one bit. Therefore, 128 consecutive bits are selected as observation bits, that is, the quantity P of the observation bits is 128, for example, $b_1$, $b_2$, $b_3$, . . . , $b_{127}$, and $b_{128}$ shown in FIG. 8. Based on these observation bits, a plurality of groups of first test data blocks are obtained through division from the first data sequence, and a quantity N of test data blocks in each group of first test data blocks is 2, in other words, each group of first test data blocks includes two test data blocks, for example, a plurality of groups of $B_1$ and $B_2$ shown in FIG. 8.

Based on the foregoing descriptions, in positions of the plurality of observation bits in the data sequence shown in FIG. 8, a position of only one observation bit is a true synchronization position of the data sequence. A quantity of all-zero sequences in a syndrome of each group of first test data blocks is used as a basis for selecting the candidate bit. As shown in FIG. 8, a syndrome S is a row vector whose length is 9. For example, a syndrome set of a group of first test data blocks that uses an observation bit $b_1$ as a start bit is $S^{(1)}$, including $S_1^{(1)}$ and $S_2^{(1)}$, respectively corresponding to test data blocks $B_1$ and $B_2$. Similarly, syndrome sets of groups of first test data blocks that use observation bits $b_2$, $b_3$, . . . , $b_{127}$, and $b_{128}$ as start bits are respectively $S^{(2)}$, $S^{(3)}$, . . . , $S^{(127)}$, and $S^{(128)}$. Quantities of all-zero sequences in the syndromes of all groups of first test data blocks are counted and marked as $Q_1$, $Q_2$, $Q_3$, . . . , $Q_{127}$, and $Q_{128}$. As shown in FIG. 8, $Q_1=0$, to be specific, there is no all-zero sequence in the syndrome of the group of first test data blocks that uses the observation bit $b_1$ as the start bit. Similarly, $Q_2=0$, $Q_3=1$, . . . , $Q_{127}=2$, and $Q_{128}=0$. Finally, a value of $Q_{127}$ in all 128 Q values is the largest. In this case, the observation bit $b_{127}$ is used as the candidate bit. To be specific, it is considered that the observation bit $b_{127}$ is a start bit of a test data block, and bits at an interval of an integer multiple of 128 bits after the observation bit $b_{127}$ are start bits of subsequent test data blocks.

After $b_{127}$ is selected as the candidate bit, a segment is selected from the received data sequence as the second subsequence after the first subsequence. The second subsequence herein is different from the first subsequence. A group of second test data blocks is obtained through division from the second subsequence by using a start bit as a start point. As shown in FIG. 9, the group of second test data blocks includes four test data blocks. A characteristic value of at least one second test data block is verified, where the characteristic value is a quantity of all-zero sequences in a syndrome of the at least one second test data block. In the foregoing verification manner of traversal, a total value is obtained by adding quantities of all-zero sequences in syndromes of all of the at least one second test data block. When the total value is greater than or equal to a synchronization threshold, the verification succeeds, where the synchronization threshold is 2. As shown in FIG. 9, in syndromes of the four test data blocks, a quantity of all-zero sequences is 3, and is greater than 2. Therefore, it is determined that a position of $b_{127}$ and an equivalent position thereof are both the synchronization position.

Optionally, when the verification fails, the foregoing step S220 is re-executed, that is, the first phase is re-executed, and the observation bit that is most likely to be located in the synchronization position is re-selected to determine the candidate bit.

Step S230 is an optional step, in other words, the method may include only the first phase. In this case, step S240 is directly performed after step S220. In this case, in the method, after the candidate bit is determined, the position of the candidate bit is directly determined as the synchronization position. That is, the most possible synchronization position is directly used as the synchronization position.

S240: Determine that the data sequence is in synchronization lock state.

After determining the synchronization position, the receiving end may divide the received data sequence into a plurality of synchronization codewords based on the synchronization position. When the data sequence is divided into the plurality of synchronization codewords based on the synchronization position, it may be considered that the data sequence is at a synchronization lock position. In other words, after determining the synchronization position, the receiving end determines that the data sequence is in synchronization lock state. When the data sequence is in synchronization lock state, the receiving end may perform normal processing such as error detection and error correction on the data sequence.

Figure 10A:
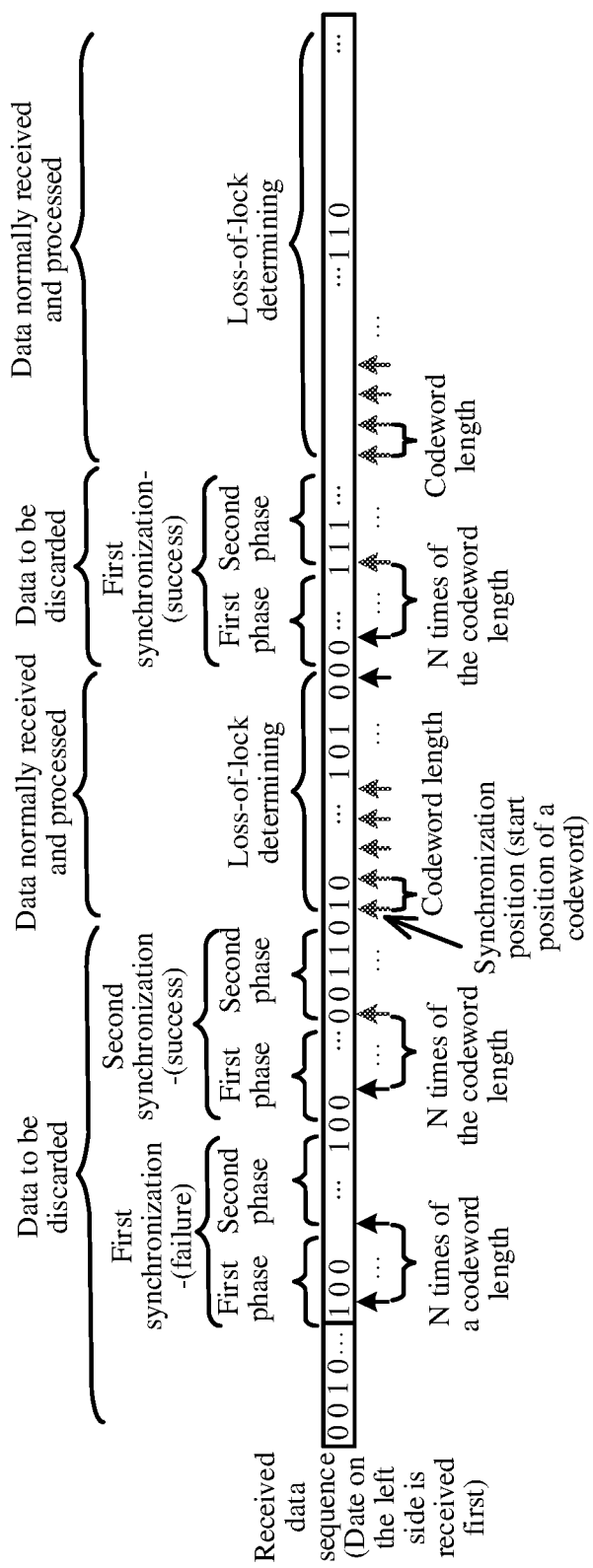
FIG. 10A is a schematic diagram of a synchronous lock process according to an embodiment of this application.

FIG. 10A illustrates an example process of synchronization lock. As shown in FIG. 10A, the receiving end receives the data sequence, and the left side of the data sequence shown in FIG. 10A is first received data. After receiving the data sequence, the receiving end starts to attempt to perform first time of codeword synchronization. Specifically, the receiving end selects at least one observation bit, and separately performs synchronization in the first phase and the second phase. For a determining process, refer to FIG. 2 and related text descriptions. Details are not described herein again. It is assumed that the first time of codeword synchronization fails. For example, after the candidate bit is determined in the first phase, verification on the candidate bit fails in the second phase. In this case, the receiving end continues to attempt to perform second time of codeword synchronization. Specifically, the receiving end continues to select at least one observation bit in the data sequence forwards based on a receiving order, and separately performs synchronization in the first phase and the second phase. For a determining process, refer to FIG. 2 and related text descriptions. Details are not described herein again. It is assumed that the codeword synchronization for the second time succeeds. For example, after the candidate bit is determined in the first phase, verification on the candidate bit succeeds in the second phase. In this case, the receiving end determines the synchronization position based on the candidate bit. Specifically, the receiving end discards data used in the first-time synchronization and data used in the second-time synchronization. After the discarded data, codewords are obtained through division based on the synchronization position determined in the successful synchronization, and normal data processing is performed.

S250: Perform loss-of-lock determining.

Optionally, after the foregoing synchronization lock, the receiving end may continue to: receive a second data sequence, where the second data sequence includes a plurality of bits; determine a synchronization position of the second data sequence based on the synchronization position of the first data sequence, where the synchronization position of the second data sequence indicates a start position of a codeword that is in the second data sequence; and determine, based on the synchronization position of the second data sequence, whether the second data sequence is in loss-of-lock state.

After starting to perform operations such as error detection and error correction on the received data sequence, the receiving end still needs to continuously observe whether codeword division in the subsequently received data sequence is accurate, that is, whether the synchronization position is accurate. When the synchronization position is inaccurate, content of each test data block obtained through division based on the synchronization position no longer corresponds to a true codeword. In this case, this may also be referred to as that the synchronization lock state of the data sequence is lost. Therefore, a process of determining whether the synchronization position of the data sequence is accurate may also be referred to as a loss-of-lock determining process. The subsequently received data sequence may be referred to as a second data sequence, so as to distinguish the second data sequence from the first data sequence. As shown in FIG. 10A, the first data sequence may correspond to the 1$^{st}$ segment of data to be discarded in FIG. 10A, and the second data sequence may correspond to the 1$^{st}$ segment of data that is normally received and processed and that is after the 1$^{st}$ segment of data to be discarded in FIG. 10A. Optionally, the codeword in the second data sequence also includes the foregoing extension information for verifying the codeword.

In the loss-of-lock determining process, a plurality of synchronization codewords are obtained through division from the subsequently received data sequence based on the synchronization position, where the synchronization position is a start position of the plurality of synchronization codewords.

Optionally, in the loss-of-lock determining process, a group of bits may be selected, from the plurality of bits included in the second data sequence, as the extension information to perform verification, or characteristic values of the plurality of synchronization codewords may be verified, or both of the foregoing two may be verified. When the verification fails, it is determined that the data sequence is in loss-of-lock state. For a specific verification process, refer to the descriptions of the two verification processes in the first phase. Details are not described herein again.

Optionally, the plurality of synchronization codewords may be consecutive, in other words, the plurality of synchronization codewords include N consecutive codewords. When a length of each codeword is n bits, N*n consecutive bits after the codeword are selected. In this case, the plurality of synchronization codewords are obtained.

Optionally, the plurality of synchronization codewords may alternatively be inconsecutive, and a start position of each of the plurality of synchronization codewords is associated with the synchronization position. Specifically, an interval between the start position of each synchronization codeword and the synchronization position is an integer multiple of the length of the codeword, in other words, an interval between every two of the plurality of synchronization codewords is an integer multiple of the length of the codeword. In addition, intervals between every two of the plurality of synchronization codewords may be the same or may be different.

Optionally, the characteristic values of the plurality of the synchronization codewords are verified, and a verification manner may be the verification manner of early termination. Specifically, the characteristic value of each of the plurality of synchronization codewords is sequentially accumulated to obtain an accumulated value. When the accumulated value meets a loss-of-lock condition, the verification fails, and the position of the candidate bit is determined as the synchronization position.

The loss-of-lock condition is associated with the characteristic value. Specifically, the characteristic value is a quantity of non-all-zero sequences in a syndrome, and the loss-of-lock condition is that the accumulated value is greater than or equal to a synchronization threshold; the characteristic value is a quantity of non-zero elements in a syndrome, and the loss-of-lock condition is that the accumulated value is greater than or equal to a synchronization threshold; the characteristic value is a quantity of error-uncorrectable codewords, and the loss-of-lock condition is that the accumulated value is greater than or equal to a synchronization threshold; or the characteristic value is a quantity of codewords whose recalculated parity bits are different from original parity bits, and the loss-of-lock condition is that the accumulated value is greater than or equal to a synchronization threshold.

The length of the codeword is n bits, the first k bits of the codeword are information bits, last (n–k) bits of the codeword are the original parity bits, the recalculated parity bits are obtained based on the information bits, a length of the recalculated parity bits is (n–k) bits, and n and k are integers.

A value of the synchronization threshold may alternatively be obtained through simulation analysis. In addition, the synchronization threshold in step 250 and the synchronization threshold in steps 230 and 2222 may have a same value, or may have different values.

Optionally, the characteristic values of the plurality of the synchronization codewords are verified, and a verification manner may be the verification manner of traversal. Specifically, the characteristic values of all of the plurality of synchronization codewords are added to obtain a total value. When the total value meets a loss-of-lock condition, the verification fails, and the position of the candidate bit is determined as the synchronization position.

The synchronization condition is associated with the characteristic value. Specifically, the characteristic value is a quantity of all-zero sequences in a syndrome, and the loss-of-lock condition is that the total value is less than or equal to a synchronization threshold; the characteristic value is a quantity of non-all-zero sequences in a syndrome, and the loss-of-lock condition is that the total value is greater than or equal to a synchronization threshold; the characteristic value is a quantity of zero elements in a syndrome, and the loss-of-lock condition is that the total value is less than or equal to a synchronization threshold; the characteristic value is a quantity of non-zero elements in a syndrome, and the loss-of-lock condition is that the total value is greater than or equal to a synchronization threshold; the characteristic value is a quantity of error-correctable codewords, and the loss-of-lock condition is that the total value is less than or equal to a synchronization threshold; the characteristic value is a quantity of error-uncorrectable codewords, and the loss-of-lock condition is that the total value is greater than or equal to a synchronization threshold; the characteristic value is a quantity of codewords whose recalculated parity bits are the same as original parity bits, and the loss-of-lock condition is that the total value is less than or equal to a synchronization threshold; or the characteristic value is a quantity of codewords whose recalculated parity bits are different from original parity bits, and the loss-of-lock condition is that the total value is greater than or equal to a synchronization threshold.

The length of the codeword is n bits, the first k bits of the codeword are information bits, last (n–k) bits of the codeword are the original parity bits, the recalculated parity bits are obtained based on the information bits, a length of the recalculated parity bits is (n–k) bits, and n and k are integers.

A value of the synchronization threshold may alternatively be obtained through simulation analysis. In addition, the synchronization threshold in step 250 and the synchronization threshold in steps 230 and 2222 may have a same value, or may have different values.

In the verification manner of early termination and the verification manner of traversal, the characteristic values may be calculated in parallel, to be specific, characteristic values of a plurality of test data blocks are calculated by using a plurality of calculation units simultaneously. For example, 10 calculation units are used to calculate characteristic values of 10 test data blocks simultaneously. A parallel calculation mode can save computing time and reduce a latency.

Figure 10B:
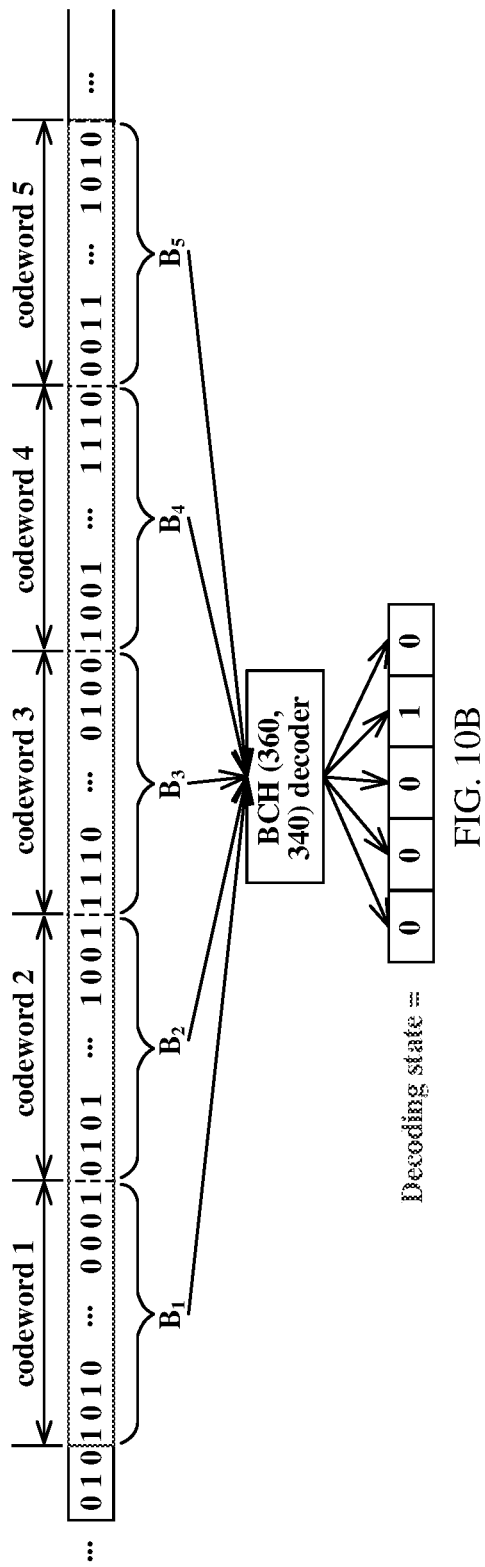
FIG. 10B shows synchronous loss-of-lock determining according to an embodiment of this application.

FIG. 10B shows an example process of loss-of-lock determining. As shown in FIG. 10B, five synchronization codewords are obtained through division from the data sequence based on the synchronization position, and a quantity of error-correctable codewords in the synchronization codewords is counted. For example, in decoding state, 0 indicates error-uncorrectable, and 1 indicates error-correctable. In this case, in the five synchronization codewords shown in FIG. 10B, the quantity of error-correctable codewords is 1. If a loss-of-lock threshold is 3, the quantity of error-correctable codewords is less than the loss-of-lock threshold, and it is determined that five synchronization codewords meet the loss-of-lock condition, and the data sequence is in loss-of-lock state.

Optionally, when the verification does not fail, it is determined that the synchronization lock state of the data sequence is not lost.

Optionally, after it is determined that the synchronization lock state of the data sequence is not lost, a plurality of synchronization codewords may be selected by moving forwards at a specific interval in the data sequence, and whether the plurality of synchronization codewords that are selected forwards meet the loss-of-lock condition is further determined. Optionally, the moving forwards at a specific interval may be moving by one test data block, to be specific, for each synchronization codeword, a plurality of synchronization codewords are observed forwards by using the synchronization codeword as a start, so as to perform loss-of-lock determining.

S260: Determine that the data sequence is in loss-of-lock state.

Optionally, in response to a case in which the second data sequence is in loss-of-lock state, the receiving end determines an updated synchronization position of the second data sequence.

Optionally, when it is determined that the second data sequence is in loss-of-lock state, codeword synchronization is performed again on a subsequently received data sequence. The subsequently received data sequence may be referred to as a third data sequence, so as to distinguish the third data sequence from the first data sequence and the second data sequence. Specifically, the receiving end may continue to determine an updated synchronization position of the third data sequence. Specifically, the first phase and the second phase are re-executed, and a synchronization position determined in the second phase that is re-executed is used as the updated synchronization position of the third data sequence. In addition, after determining the updated synchronization position of the third data sequence, the receiving end may divide a subsequently received fourth data sequence into a plurality of synchronization codewords based on the synchronization position, and perform normal processing on the subsequently received fourth data sequence. As shown in FIG. 10A, the third data sequence may correspond to the $2^{nd}$ segment of data to be discarded in FIG. 10A, and the fourth data sequence may correspond to the $2^{nd}$ segment of data that is normally received and processed and that is after the $2^{nd}$ segment of data to be discarded in FIG. 10A. Optionally, the codewords in the third data sequence and the fourth data sequence also include the foregoing extension information for verifying the codewords. In this way, a closed-loop operation of synchronization lock-loss-of-lock-synchronization lock is implemented, which ensures that the communication system is in normal working state of synchronization lock in as much time as possible.

According to the method, a technical problem of adding additional data and poor cascading scalability in an AM synchronization solution can be resolved. In addition, there is no need to insert additional data into a data stream at the transmitting end. Therefore, there is no need to introduce an idle (Idle) code block addition or deletion mechanism on an Ethernet interface, design a corresponding logic processing unit, and reserve a bandwidth in advance for an inserted AM sequence. If one level of FEC needs to be added to original FEC, when two levels of FEC are cascaded, technical problems that the original idle code block addition or deletion mechanism cannot be applied to an AM sequence of the second-level FEC, and that high-precision clock synchronization performance is affected by adding an AM sequence to the second-level FEC can be avoided. According to the method, a technical effect of high-precision codeword synchronization of a data stream at the receiving end can be achieved, and synchronization performance of the method reaches relatively high reliability.

Steps S240, S250, and S260 are all optional steps. To be specific, the method may be used only for determining the synchronization position. Error detection or error correction processing in synchronization lock state may not be performed on the data sequence, and whether the data sequence subsequently enters the loss-of-lock state may not be determined.

Through simulation comparison, compared with the existing AM synchronization solution, the codeword synchronization method provided in this application is better than the existing AM synchronization solution in terms of performance indicators such as average synchronization lock time, average occurrence time of false lock, and average occurrence time of false loss-of-lock. Therefore, from an overall perspective, the codeword synchronization method provided in this application can achieve better synchronization performance than the AM synchronization solution.

Figure 11:
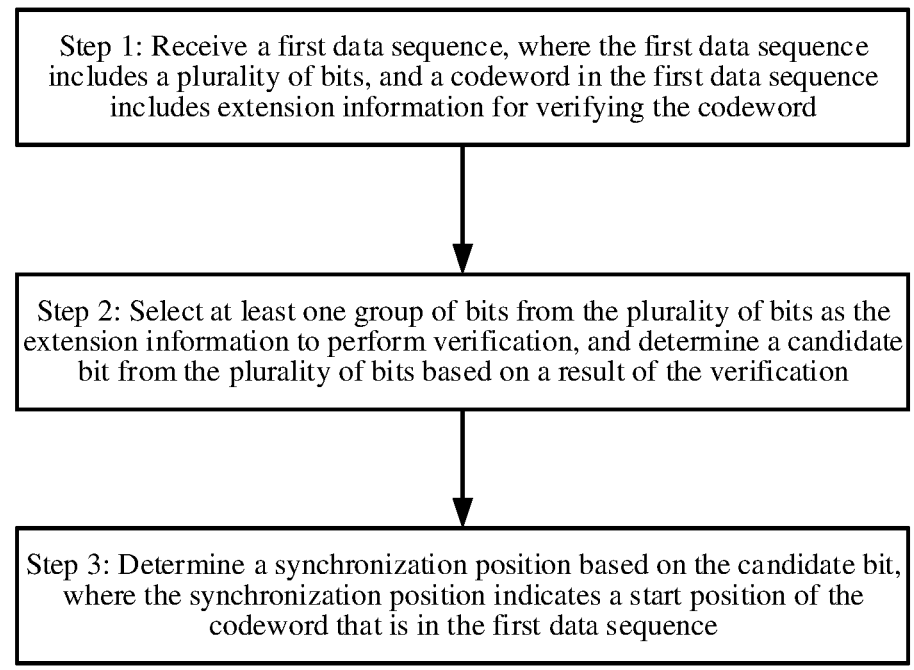
FIG. 11 is a synchronization flowchart according to an embodiment of this application.

FIG. 11 shows a codeword synchronization method according to an embodiment of this application. The method includes the following steps.

Step 1: Receive a first data sequence, where the first data sequence includes a plurality of bits, and a codeword in the first data sequence includes extension information for verifying the codeword. For a specific process of step 1, refer to the foregoing descriptions of step S210.

Step 2: Select at least one group of bits from the plurality of bits as the extension information to perform verification, and determine a candidate bit in the plurality of bits based on a result of the verification. The candidate bit is an observation bit that is most likely to be located in a synchronization position. For a specific process of step 2, refer to the foregoing descriptions of step S220.

Step 3: Determine the synchronization position based on the candidate bit, where the synchronization position indicates a start position of the codeword that is in the first data sequence.

Optionally, the determining the synchronization position based on the candidate bit may be: after the observation bit that is most likely to be located in the synchronization position is selected, further verifying whether a position of the observation bit that is most likely to be located in the synchronization position is the synchronization position. The candidate bit is the observation bit that is most likely to be located in the synchronization position. In this case, for a specific process of step 3, refer to the foregoing descriptions of step S230. In this case, the method includes at least S210, S220, and S230 shown in FIG. 2.

Optionally, the determining the synchronization position based on the candidate bit may alternatively be: after the observation bit that is most likely to be located in the synchronization position is selected, directly using the observation bit that is most likely to be located in the synchronization position as the synchronization position. The candidate bit is the observation bit that is most likely to be located in the synchronization position. In this case, the method includes at least S210 and S220 shown in FIG. 2.

It can be seen that, in the foregoing two manners of determining the synchronization position based on the candidate bit, the bit located in the synchronization position is included in the candidate bit, and the candidate bit is the observation bit that is most likely to be located in the synchronization position.

Optionally, after step 3, the method further includes: determining that the data sequence is in synchronization lock state. For a specific process, refer to the foregoing descriptions of step S240.

Optionally, after step 3, the method further includes: performing loss-of-lock determining. For a specific process, refer to the foregoing descriptions of step S250.

Optionally, the method may further include step 4: In response to a case in which the data sequence is in loss-of-lock state, determine an updated synchronization position of the data sequence. For a specific process, refer to the foregoing descriptions of step S260.

The codeword synchronization method in embodiments of this application is performed by a chip, and the chip may be any chip that performs FEC.

Figure 12A:
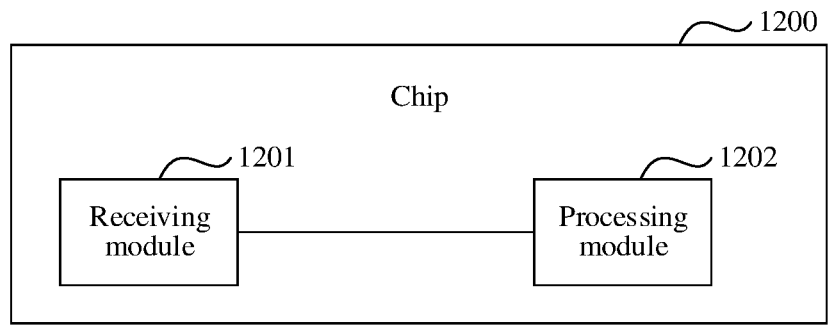
FIG. 12A is a schematic diagram of a structure of a chip according to an embodiment of this application.

FIG. 12A is a possible schematic diagram of a structure of a chip according to an embodiment of this application. Refer to FIG. 12A. A chip 1200 includes a receiving module 1201 and a processing module 1202. These modules may be functional circuits in the chip, and these modules may perform corresponding steps of the methods shown in FIG. 2 to FIG. 9, FIG. 10A, FIG. 10B, and FIG. 11. For example, the receiving module 1201 is configured to receive a first data sequence, where the first data sequence includes a plurality of bits, and a codeword in the first data sequence includes extension information for verifying the codeword.

The processing module 1202 is configured to: select at least one group of bits from the plurality of bits as the extension information to perform verification, and determine a candidate bit in the plurality of bits based on a result of the verification; and determine a synchronization position based on the candidate bit, where the synchronization position indicates a start position of a codeword that is in the first data sequence.

Optionally, the chip may be used in an application scenario of two-level FEC cascading. Specifically, the two-level FEC cascading includes inner FEC and outer FEC, and the chip provided in embodiments of this application is for the inner FEC. The inner FEC uses the codeword synchronization method described in this application, and is also referred to as FEC 1. The outer FEC may use an AM synchronization solution, and is also referred to as FEC 2. In this case, FEC 1 and FEC 2 may be located on a same chip, or may be located on different chips. In other words, the chip provided in embodiments of this application may include only FEC 1, or may include FEC 1 and FEC 2.

The codeword synchronization method in embodiments of this application is performed by a communication device. The communication device may be any device that performs FEC, and includes but is not limited to a router, a switch, a server, and a terminal device.

Figure 12B:
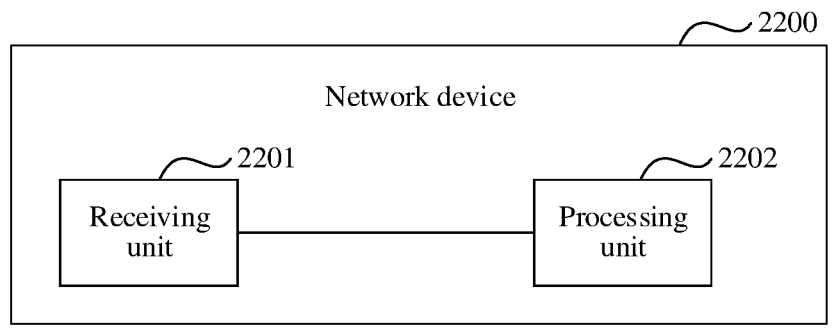
FIG. 12B is a schematic diagram of a structure of a communication device according to an embodiment of this application.

FIG. 12B is a possible schematic diagram of a structure of a communication device according to an embodiment of this application. Refer to FIG. 12B. A communication device 2200 includes a receiving unit 2201 and a processing unit 2202. These units may perform corresponding steps of the method shown in FIG. 2 to FIG. 9, FIG. 10A, FIG. 10B, and FIG. 11. For example, the receiving unit 2201 is configured to receive a data sequence, where the data sequence includes a plurality of bits.

The processing unit 2202 is configured to: determine a candidate bit in the data sequence, where the candidate bit is included in the plurality of bits; and determine a synchronization position based on the candidate bit, where the synchronization position indicates a start position of a codeword that is in the data sequence.

Figure 13:
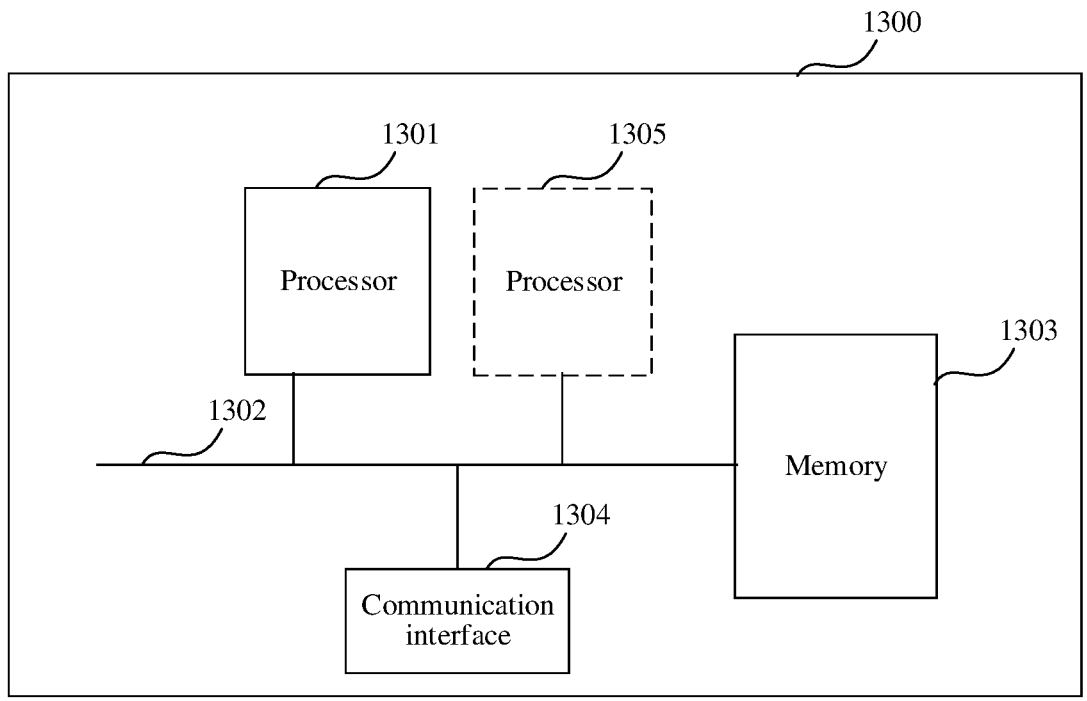
FIG. 13 is a schematic diagram of a structure of a communication device according to an embodiment of this application.

FIG. 13 is a schematic diagram of another structure of a communication device according to an embodiment of this application. In FIG. 13, the communication device 1300 includes at least one processor 1301 and at least one communication interface 1304. Optionally, the device 1300 may further include a memory 1303.

The processor 1301 may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various example logical blocks, modules, and circuits described with reference to content disclosed in embodiments of this application. Alternatively, the processor may be a combination of processors implementing a computing function, for example, a combination of one or more microprocessors, or a combination of a DSP and a microprocessor. The processor may be configured to: determine a candidate bit in a data sequence, and determine a synchronization position based on the candidate bit, to implement the method provided in embodiments of this application.

Optionally, the communication bus 1302 is configured to perform information transmission between the processor 1301, the communication interface 1304, and the memory 1303. The bus may be a peripheral component interconnect (PCI for short) bus, an extended industry standard architecture (EISA for short) bus, or the like. The bus may be classified into an address bus, a data bus, a control bus, and the like. For ease of indication, the bus is indicated by using only one thick line in FIG. 13. However, this does not indicate that there is only one bus or only one type of bus.

The memory 1303 may be a read-only memory (ROM) or another type of static storage device that can store static information and instructions, a random access memory (RAM) or another type of dynamic storage device that can store information and instructions. Alternatively, the memory 1303 may be an electrically erasable programmable read-only memory (EEPROM), a compact disc read-only memory (CD-ROM) or another compact disc storage, an optical disc storage (including a compact optical disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer. However, the memory 1303 is not limited thereto. The memory 1303 may exist independently, and is connected to the processor 1301 through the communication bus 1302. The memory 1303 may alternatively be integrated into the processor 1301.

Optionally, the memory 1303 is configured to store the program code or the instructions for executing the solutions of this application, and the processor 1301 controls the execution. When the embodiment shown in FIG. 12B is implemented and the units described in the embodiment of FIG. 12B are implemented by using software, software or program code required for performing functions of the units in FIG. 12B is stored in the memory 1303. The processor 1301 is configured to execute the program code stored in the memory 1303. The program code may include one or more software modules. Optionally, the processor 1301 may alternatively store program code or instructions for executing the solutions of this application.

The communication interface 1304 is configured to use any apparatus such as a transceiver to communicate with another device or communication network. The communication network may be the Ethernet, a radio access network (RAN), a wireless local area network (WLAN), or the like. In this embodiment of this application, the communication interface 1304 may be configured to: receive a packet sent by another node on a segment routing network, or send a packet to the another node on the segment routing network. The communication interface 1304 may be an Ethernet interface, a fast Ethernet (FE) interface, a Gigabit Ethernet (GE) interface, or an asynchronous transfer mode (ATM) interface.

In a specific implementation, in an embodiment, the device 1300 may include a plurality of processors, for example, the processor 1301 and a processor 1305 that are shown in FIG. 13. Each of the processors may be a single-core (single-CPU) processor, or may be a multi-core (multi-CPU) processor. The processor herein may be one or more devices, circuits, and/or processing cores configured to process data (such as computer program instructions).

In a specific embodiment, the processor 1301 in the network device 1300 is configured to: receive the data sequence through a communication interface, where the data sequence includes a plurality of bits; determine the candidate bit in the data sequence, where the candidate bit is included in the plurality of bits; and determine the synchronization position based on the candidate bit, where the synchronization position indicates a start position of a codeword that is in the data sequence. For a detailed processing process of the processor, refer to detailed descriptions of steps S210, S220, S230, S240, S250, and S260 in the embodiment shown in FIG. 2, steps S221 and S222 in the embodiment shown in FIG. 3, and steps 1 to 3 shown in FIG. 11. Details are not described herein again.

The communication interface in the network device 1300 is used by the network device 1300 to receive and send the data sequence via a network system. For a specific process, refer to detailed descriptions of S210 in the embodiment shown in FIG. 2 and step 1 shown in FIG. 11. Details are not described herein again.

Figure 14:
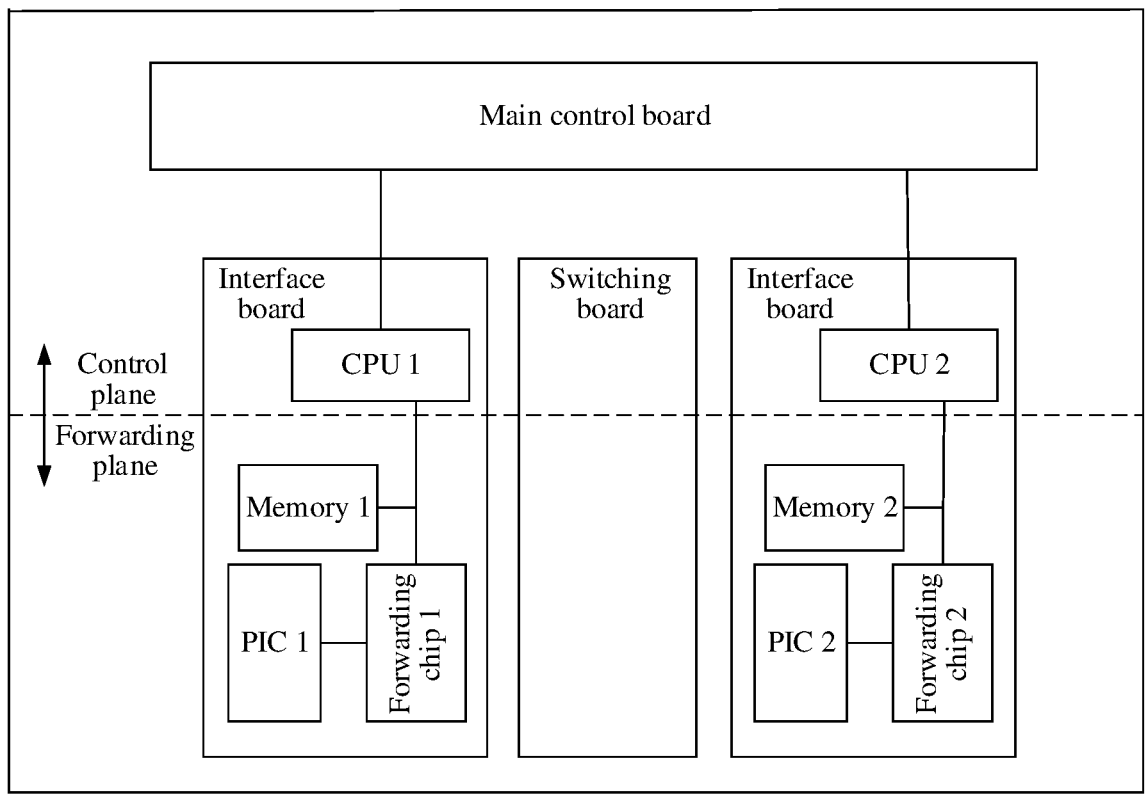
FIG. 14 is a schematic diagram of a structure of a communication device according to an embodiment of this application.

FIG. 14 is a schematic diagram of another structure of a communication device according to an embodiment of this application. When the communication device is a forwarding device in a network, for example, a router or a switch, for the communication device, refer to a schematic diagram of a structure of a device shown in FIG. 14. The device 1400 includes a main control board and one or more interface boards. The main control board and the interface board are communicatively connected. The main control board is also referred to as a main processing unit (MPU) or a route processor card. The main control board is responsible for controlling and managing components in the device 1400, including functions of route calculation, and device management and maintenance. The interface board is also referred to as a line processing unit (LPU) or a line card, and is configured to forward data. In some embodiments, the device 1400 may also include a switching board. The switching board is communicatively connected to the main control board and the interface board. The switching board is configured to forward data between the interface boards. The switching board may also be referred to as a switch fabric unit (SFU). The interface board includes a central processing unit, a memory, a forwarding chip, and a physical interface card (PIC). The central processing unit is communicatively connected to the memory, a network processor, and the physical interface card. The memory is configured to store a forwarding table. The forwarding chip is configured to forward a received data frame based on the forwarding table stored in the memory. If a destination address of the data frame is an address of the device 1400, the data frame is sent to the CPU for processing. If the destination address of the data frame is not an address of the device 1400, a next hop and an outbound interface that correspond to the destination address are found in the forwarding table based on the destination address, and the data frame is forwarded to the outbound interface corresponding to the destination address. The forwarding chip may be a network processor (NP). The PIC, also referred to as a subcard, may be installed on the interface board. The PIC is responsible for converting a photosignal into a data frame, checking validity of the data frame, and forwarding the data frame to the forwarding chip for processing. In some embodiments, the central processing unit may also perform a function of the forwarding chip, for example, implement software forwarding based on a general-purpose CPU, so that the interface board does not need the forwarding chip. A communication connection between the main control board, the interface board, and the switching board may be implemented through a bus. In some embodiments, the forwarding chip may be implemented via an application-specific integrated circuit (ASIC) or a field programmable gate array (FPGA).

Logically, the device 1400 includes a control plane and a forwarding plane. The control plane includes the main control board and the central processing unit. The forwarding plane includes components for performing forwarding, for example, the memory, the PIC, and the NP. The control plane performs functions such as a function of a router, generating a forwarding table, processing signaling and protocol packets, and configuring and maintaining a status of a PE 1. The control plane delivers the generated forwarding table to the forwarding plane. On the forwarding plane, the NP searches the forwarding table delivered by the control plane to forward, based on content in the forwarding table, a packet received by the PIC of the device 1400. The forwarding table delivered by the control plane may be stored in the memory. In some embodiments, the control plane and the forwarding plane may be completely separated, and are not on a same device.

In a specific embodiment, the interface board is configured to receive a data sequence, where the data sequence includes a plurality of bits. For a specific process, refer to detailed descriptions of S210 in the embodiment shown in FIG. 2 and step 1 shown in FIG. 11. Details are not described herein again. The main control board is configured to: determine a candidate bit in the data sequence, where the candidate bit is included in the plurality of bits; and determine a synchronization position based on the candidate bit, where the synchronization position indicates a start position of a codeword that is in the data sequence. For a detailed processing process, refer to detailed descriptions of steps S210, S220, S230, S240, S250, and S260 in the embodiment shown in FIG. 2, steps S221 and S222 in the embodiment shown in FIG. 3, and steps 1 to 3 shown in FIG. 11. Details are not described herein again.

In a possible implementation, an inter-process communication (inter-process communication, IPC) channel is established between the main control board and the interface board, and the main control board and the interface board communicate with each other through the IPC channel.

An embodiment of this application provides a chip. The chip includes a memory and a processor. The memory is configured to store a computer program. The processor is configured to invoke the computer program from the memory and run the computer program, to perform the methods in the foregoing method embodiments, namely, the methods in embodiments shown in FIG. 2 to FIG. 9, FIG. 10A, FIG. 10B, and FIG. 11.

Optionally, the chip includes only the processor. The processor is configured to read and execute the computer program stored in the memory. When the computer program is executed, the processor performs the methods in the foregoing method embodiments, namely, the methods in embodiments shown in FIG. 2 to FIG. 9, FIG. 10A, FIG. 10B, and FIG. 11.

An embodiment of this application provides a network system. The network system includes a receiving device and a sending device. The receiving device is configured to receive a data sequence sent by the sending device. The receiving device may perform steps in embodiments shown in FIG. 2 to FIG. 9, FIG. 10A, FIG. 10B, and FIG. 11.

An embodiment of this application further provides a non-transient storage medium, configured to store software instructions used in the foregoing embodiments. The non-transient storage medium includes a program for performing the methods shown in the foregoing embodiments. When the program is executed on a computer or a network device, the computer or the network device is enabled to perform the methods in the foregoing method embodiments.

An embodiment of this application further provides a computer program product including computer program instructions. When the computer program product runs on a computer, a network node is enabled to perform the methods in the foregoing method embodiments.

It should be noted that any apparatus embodiment described above is merely an example. The units described as separate parts may or may not be physically separate, and parts displayed as units may or may not be physical units, that is, may be located in one position, or may be distributed on a plurality of network units. Some or all of the modules may be selected based on actual requirements to achieve the objectives of the solutions in embodiments. In addition, in the accompanying drawings of embodiments of the network device or the host provided in this application, connection relationships between modules indicate that the modules have a communication connection to each other, which may be specifically implemented as one or more communication buses or signal cables. A person of ordinary skill in the art may understand and implement embodiments without creative efforts.

Methods or algorithm steps described in the content disclosed in embodiments of this application may be implemented by hardware, or may be implemented by a processor by executing software instructions. The software instructions may be formed by a corresponding software module. The software module may be stored in a random access memory (RAM), a flash memory, a read-only memory (ROM), an erasable programmable read-only memory (EPROM), an electrically erasable programmable read-only memory (Electrically EPROM, EEPROM), a hard disk, a removable hard disk, an optical disc, or any other form of storage medium well-known in the art. A storage medium is coupled to a processor, so that the processor can read information from the storage medium. Certainly, the storage medium may be a component of the processor.

In the foregoing specific implementations, the objectives, technical solutions, and beneficial effects of this application are further described in detail. It should be understood that the foregoing descriptions are merely specific implementations of this application, but are not intended to limit the protection scope of this application. Any modification, equivalent replacement, improvement, or the like made based on the technical solutions of this application shall fall within the protection scope of this application.

In this application, the terms "first", "second", and the like are used to distinguish between same or similar items whose effects and functions are basically the same. It should be understood that there is no logical or time-sequence dependency among "first", "second", and "$n^{th}$", and a quantity and an execution sequence are not limited. It should also be understood that although the terms such as "first" and "second" are used in the following descriptions to describe various elements, these elements should not be limited by the terms. These terms are merely used to distinguish one element from another element. For example, without departing from the scope of the various examples, a first image may be referred to as a second image, and similarly, a second image may be referred to as a first image. Both the first image and the second image may be images, and in some cases, may be separate and different images.

In this application, the term "at least one" means one or more, and the term "a plurality of" means two or more. For example, a plurality of second packets mean two or more second packets. The terms "system" and "network" may be used interchangeably in this specification.

It should be understood that the terms used in the descriptions of various examples in this specification are merely intended to describe specific examples, but are not intended to constitute a limitation. The terms "one" ("a" and "an") and "the" of singular forms used in the descriptions of the various examples and the appended claims are also intended to include plural forms, unless otherwise specified in the context clearly.

It should be further understood that, the term "and/or" used in this specification indicates and includes any or all possible combinations of one or more items in associated listed items. The term "and/or" describes an association relationship between associated objects and represents that three relationships may exist. For example, A and/or B may represent the following three cases: Only A exists, both A and B exist, and only B exists. In addition, the character "/" in this application generally indicates an "or" relationship between associated objects.

It should be further understood that sequence numbers of processes do not mean execution sequences in embodiments of this application. The execution sequences of the processes should be determined based on functions and internal logic of the processes, and should not constitute as any limitation on the implementation processes of embodiments of this application.

It should be understood that determining B based on A does not mean that B is determined based only on A, and B may be determined based on A and/or other information.

It should be further understood that the term "include" (also referred to as "includes", "including", "comprises", and/or "comprising") used in this specification specifies presence of the stated features, integers, steps, operations, elements, and/or components, with presence or addition of one or more other features, integers, steps, operations, elements, components, and/or groups thereof not excluded.

It should be further understood that the term "if" may be interpreted as a meaning "when" ("when" or "upon"), "in response to determining", or "in response to detecting". Similarly, based on a context, the phrase "if it is determined that" or "if (a stated condition or event) is detected" may be interpreted as a meaning of "when it is determined that" or "in response to determining" or "when (a stated condition or event) is detected" or "in response to detecting (a stated condition or event)".

It should be understood that "one embodiment", "an embodiment", and "a possible implementation" mentioned in the entire specification mean that particular features, structures, or characteristics related to an embodiment or the implementations are included in at least one embodiment of this application. Therefore, "in one embodiment", "in an embodiment", or "in a possible implementation" appearing throughout this specification does not necessarily mean a same embodiment. In addition, these particular features, structures, or characteristics may be combined in one or more embodiments in any appropriate manner.

What is claimed is:

1. A codeword synchronization method, wherein the method comprises:
    receiving a first data sequence, wherein the first data sequence comprises a plurality of bits, and a codeword in the first data sequence comprises extension information for verifying the codeword;
    selecting at least one group of bits from the plurality of bits as the extension information to perform verification, and determining a candidate bit in the plurality of bits based on a result of the verification;
    determining multiple second test data blocks in the first data sequence based on the candidate bit, wherein a length of an interval between a position of the candidate bit and a start position of the multiple second test data blocks is an integer multiple of the length of the codeword that is in the first data sequence; and
    verifying a characteristic value of the multiple second test data blocks, and when the verification succeeds, determining the position of the candidate bit as a synchronization position.

2. The method according to claim 1, wherein the selecting at least one group of bits from the plurality of bits as the extension information to perform the verification, and determining the candidate bit in the plurality of bits based on the result of the verification comprises:
    determining the candidate bit from among the plurality of bits based on a result of the verification of the extension information and a characteristic value of at least one group of first test data blocks in the first data sequence, wherein each group of the at least one group of first test data blocks comprises multiple first test data blocks, and wherein an interval between a start position of each first test data block in a first group of the at least one group of first test data blocks and the candidate bit is an integer multiple of the length of the codeword.

3. The method according to claim 2, wherein the method further comprises:
    determining a synchronization possibility index of each group of the at least one group of first test data blocks based on the result of the verification of the extension information and characteristic values of the at least one group of first test data blocks.

4. The method according to claim 1, wherein the method further comprises:
    selecting at least one group of bits from the multiple second test data blocks as the extension information to perform verification, and when both the verification of the extension information and the verification of the characteristic value succeed, determining the position of the candidate bit as the synchronization position.

5. The method according to claim 1, wherein the first data sequence comprises a first subsequence and a second subsequence, the second subsequence is partially the same as, or different from the first subsequence, the candidate bit is comprised in the first subsequence, and the multiple second test data blocks are comprised in the second subsequence.

6. The method according to claim 1, wherein the characteristic value comprises:
    a quantity of test data blocks determined as correct codewords;
    a quantity of all-zero sequences in a syndrome;
    a quantity of zero elements in the syndrome;
    a quantity of error-correctable test data blocks; or
    a quantity of test data blocks that pass recheck, wherein in the test data blocks that pass the recheck, a first bit set obtained based on first k bits of the codeword in the first data sequence is the same as original parity bits of the test data blocks, the first k bits of the codeword in the first data sequence are information bits, and k is an integer; or
    the characteristic value comprises:
    a quantity of test data blocks determined as incorrect codewords;
    a quantity of non-all-zero sequences in the syndrome;
    a quantity of non-zero elements in the syndrome;
    a quantity of error-uncorrectable test data blocks; or
    a quantity of test data blocks that fail recheck, wherein in the test data blocks that fail the recheck, a first bit set obtained based on the first k bits is different from original parity bits of the test data blocks, the first k bits of the codeword in the first data sequence are information bits, and k is an integer.

7. The method according to claim 1, further comprising after the determining the position of the candidate bit as a synchronization position:
    receiving a second data sequence, wherein the second data sequence comprises a plurality of bits;
    determining a synchronization position of the second data sequence based on the synchronization position of the first data sequence, wherein the synchronization position of the second data sequence indicates a start position of a codeword that is in the second data sequence;
    determining, based on the synchronization position of the second data sequence, whether the second data sequence is in a loss-of-lock state; and
    in response to a case in which the second data sequence is in the loss-of-lock state, determining an updated synchronization position of the second data sequence.

8. The method according to claim 7, wherein the method further comprises:
receiving a third data sequence, wherein the third data sequence comprises a plurality of bits; and
in response to the case in which the second data sequence is in the loss-of-lock state, determining an updated synchronization position of the third data sequence.

9. The method according to claim 8, wherein a codeword in the third data sequence comprises extension information for verifying the codeword, and determining the updated synchronization position of the third data sequence comprises:
selecting at least one group of bits from the plurality of bits comprised in the third data sequence as the extension information to perform verification, and determining a candidate bit in the third data sequence based on a result of the verification, wherein the candidate bit in the third data sequence is located in the plurality of bits comprised in the third data sequence; and
determining the updated synchronization position of the third data sequence based on the candidate bit in the third data sequence.

10. The method according to claim 1, wherein the extension information is for performing an additional check on the codeword to enhance performance of the codeword.

11. The method according to claim 1, wherein the extension information is comprised in information bits of the codeword, or the extension information is comprised in parity bits of the codeword.

12. The method according to claim 1, wherein the first data sequence is a linear block code.

13. The method according to claim 1, wherein verifying the characteristic value of the multiple second test data blocks comprises:
sequentially accumulating a characteristic value of each of the multiple second test data blocks to obtain a cumulative value, wherein the verification is successful when the cumulative value meets a synchronization condition.

14. The method according to claim 1, wherein the extension information is for performing a parity check or a cyclic redundancy check (CRC) check.

15. A chip configured to:
receive a first data sequence, wherein the first data sequence comprises a plurality of bits, and a codeword in the first data sequence comprises extension information for verifying the codeword;
select at least one group of bits from the plurality of bits as the extension information to perform verification, and determine a candidate bit in the plurality of bits based on a result of the verification;
determine multiple second test data blocks in the first data sequence based on the candidate bit, wherein a length of an interval between a position of the candidate bit and a start position of the multiple second test data blocks is an integer multiple of the length of the codeword that is in the first data sequence; and
verify a characteristic value of the multiple second test data blocks, and when the verification succeeds, determine the position of the candidate bit as a synchronization position.

16. The chip according to claim 15, wherein the chip is further configured to:
sequentially accumulate a characteristic value of each of the multiple second test data blocks to obtain a cumulative value, wherein the verification is successful when the cumulative value meets a synchronization condition.

17. The chip according to claim 15, wherein the extension information is for performing a parity check or a cyclic redundancy check (CRC) check.

18. A communication device, wherein the communication device comprises one or more processors and one or more memories coupled to the one or more processors, and the one or more processors are configured to:
receive a first data sequence, wherein the first data sequence comprises a plurality of bits, and a codeword in the first data sequence comprises extension information for verifying the codeword;
select at least one group of bits from the plurality of bits as the extension information to perform verification, and determine a candidate bit in the plurality of bits based on a result of the verification;
determine multiple second test data blocks in the first data sequence based on the candidate bit, wherein a length of an interval between a position of the candidate bit and a start position of the multiple second test data blocks is an integer multiple of the length of the codeword that is in the first data sequence; and
verify a characteristic value of the multiple second test data blocks, and when the verification succeeds, determine the position of the candidate bit as a synchronization position.

19. The communication device according to claim 18, wherein the one or more processors are further configured to:
sequentially accumulate a characteristic value of each of the multiple second test data blocks to obtain a cumulative value, wherein the verification is successful when the cumulative value meets a synchronization condition.

20. The communication device according to claim 18, wherein the extension information is for performing a parity check or a cyclic redundancy check (CRC) check.

21. A network system, wherein the network system comprises a sending device and a receiving device, and the receiving device is configured to:
receive a first data sequence from the sending device, wherein the first data sequence comprises a plurality of bits, and a codeword in the first data sequence comprises extension information for verifying the codeword;
select at least one group of bits from the plurality of bits as the extension information to perform verification, and determine a candidate bit in the plurality of bits based on a result of the verification;
determine multiple second test data blocks in the first data sequence based on the candidate bit, wherein a length of an interval between a position of the candidate bit and a start position of the multiple second test data blocks is an integer multiple of the length of the codeword that is in the first data sequence; and
verify a characteristic value of the multiple second test data blocks, and when the verification succeeds, determine the position of the candidate bit as a synchronization position.

22. The network system according to claim 21, wherein the receiving device is further configured to:
sequentially accumulate a characteristic value of each of the multiple second test data blocks to obtain a cumulative value, wherein the verification is successful when the cumulative value meets a synchronization condition.

23. The network system according to claim 21, wherein the extension information is for performing a parity check or a cyclic redundancy check (CRC) check.

\* \* \* \* \*